United States Patent [19]
Takeuchi et al.

[11] Patent Number: 4,515,040
[45] Date of Patent: May 7, 1985

[54] CONTROL APPARATUS AND METHOD FOR ENGINE-CONTINUOUSLY VARIABLE TRANSMISSION

[75] Inventors: Yasuhisa Takeuchi; Yoshiro Morimoto; Tadashi Suzuki, all of Yokosuka, Japan

[73] Assignee: Nissan Motor Company, Limited, Yokohama, Japan

[21] Appl. No.: 411,987

[22] Filed: Aug. 26, 1982

[30] Foreign Application Priority Data

| Aug. 27, 1981 | [JP] | Japan | 56-133327 |
| Sep. 3, 1981 | [JP] | Japan | 56-137826 |
| Sep. 3, 1981 | [JP] | Japan | 56-137827 |

[51] Int. Cl.³ .................. B60K 41/12; B60K 41/18
[52] U.S. Cl. .................................... 74/866; 74/864; 74/860; 74/859
[58] Field of Search ............... 74/857, 859, 860, 863, 74/864, 866

[56] References Cited

U.S. PATENT DOCUMENTS

| 3,335,830 | 8/1967 | Coye De Castelet | 74/859 |
| 3,596,528 | 8/1971 | Dittrich | 74/865 X |
| 4,107,776 | 8/1978 | Beale | 74/866 |
| 4,161,894 | 7/1979 | Giacosa | 74/863 |
| 4,253,347 | 3/1981 | Mizuno et al. | 74/862 |
| 4,261,229 | 4/1981 | Mizuno et al. | 74/866 |
| 4,281,567 | 8/1981 | Maurer | 74/866 |
| 4,353,272 | 10/1982 | Scheider et al. | 74/857 |
| 4,381,684 | 5/1983 | Himmelstein | 74/857 |

FOREIGN PATENT DOCUMENTS

| 5235679 | 5/1980 | Australia . |
| 0011342 | 5/1980 | European Pat. Off. . |
| 1816949 | 5/1970 | Fed. Rep. of Germany . |
| 2328112 | 12/1973 | Fed. Rep. of Germany | 74/857 |
| 2752322 | 6/1978 | Fed. Rep. of Germany . |
| 1525861 | 9/1978 | United Kingdom . |
| 1525674 | 9/1978 | United Kingdom . |
| 1566888 | 11/1979 | United Kingdom . |
| 2057606 | 4/1981 | United Kingdom . |
| 2058256 | 4/1981 | United Kingdom . |

OTHER PUBLICATIONS

Ironside et al., "Continuously Variable Transmission Control," Oct. 14–16, 1980.
Leotta, "Experiments with Electronic Control Applied to a Moped Automatic Transmission", 11/2/79.
"Belt-Drive Automatic Programmed for Economy," 372 Automotive Eng., vol. 86, No. 8, (1978.08).

Primary Examiner—George H. Krizmanich
Assistant Examiner—Dirk Wright
Attorney, Agent, or Firm—Schwartz, Jeffery, Schwaab, Mack, Blumenthal & Koch

[57] ABSTRACT

A function generator circuit is provided which generates a target engine revolution speed electric signal indicative of a target engine revolution speed which is a first predetermined function of an accelerator pedal stroke electric signal indicative of a depression degree of an accelerator pedal. There is also provided another function generator circuit which generates a target engine torque electric signal indicative of a target engine torque which is a second predetermined function of the accelerator pedal stroke electric signal. A comparator compares the actual and target engine revolution speed electric signals and generates a deviation signal indicative of a difference between these signals. A shift control varies a reduction ratio in the continuously variable transmission to vary the revolution speed of the engine in a direction to reduce the deviation signal. A fuel supply device is controlled in response to the target engine torque electric signal so as to supply a fuel enough for production of the target engine torque.

27 Claims, 26 Drawing Figures

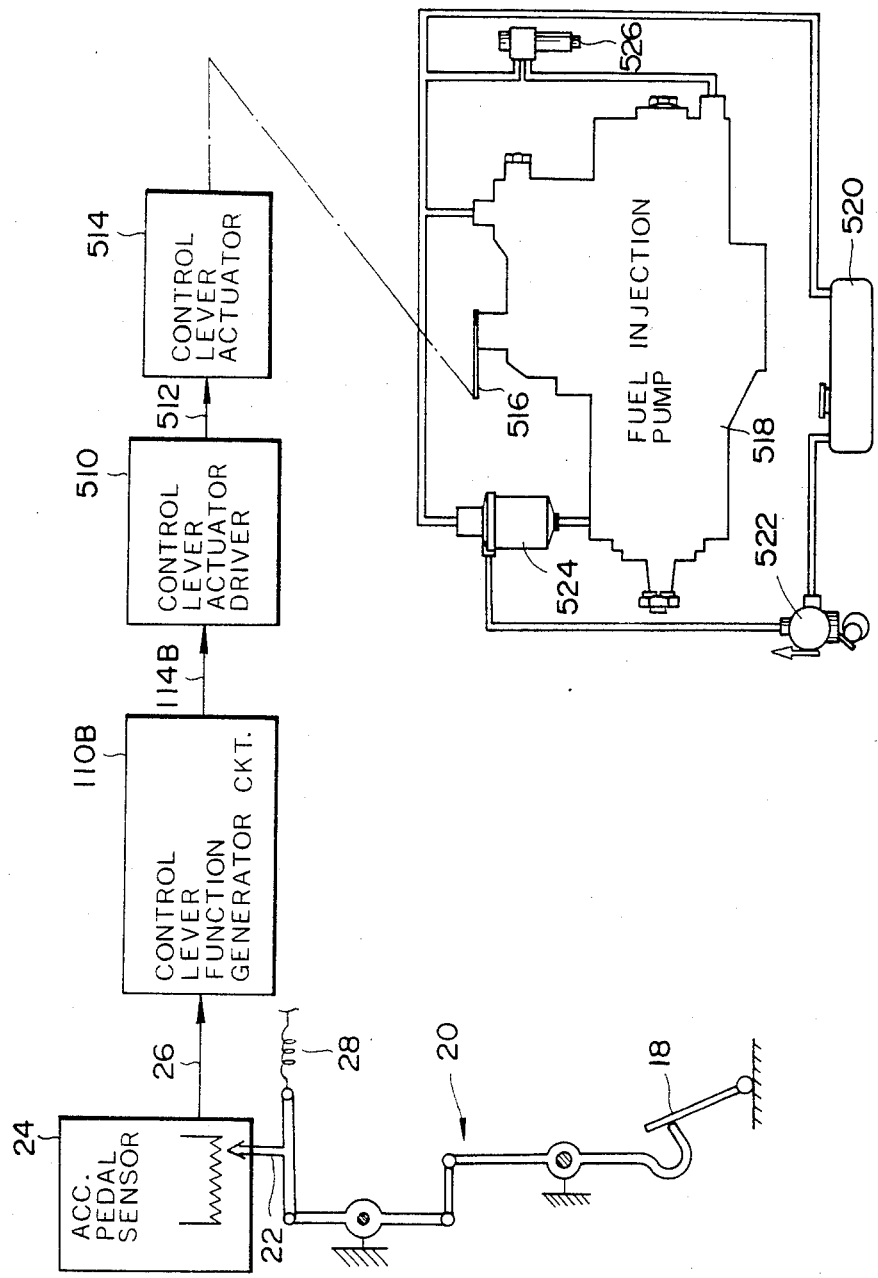

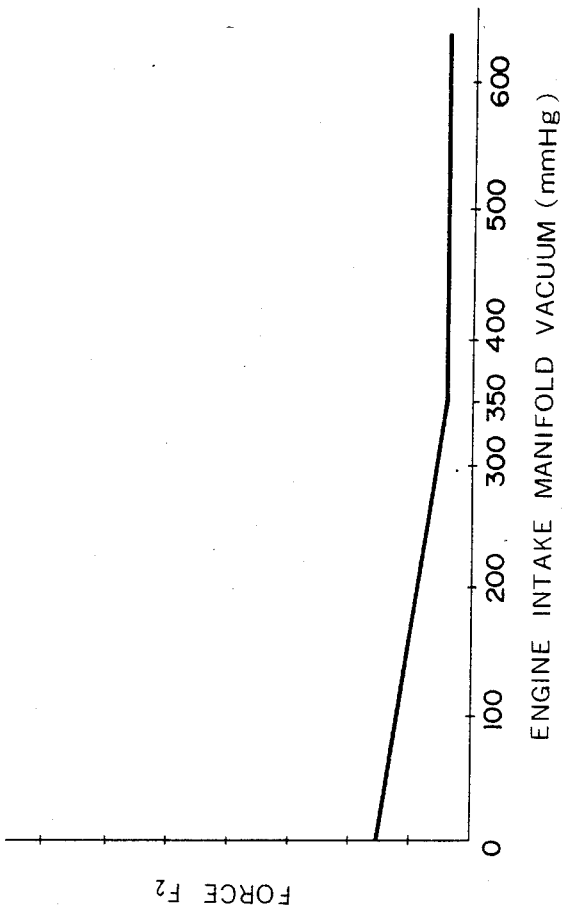

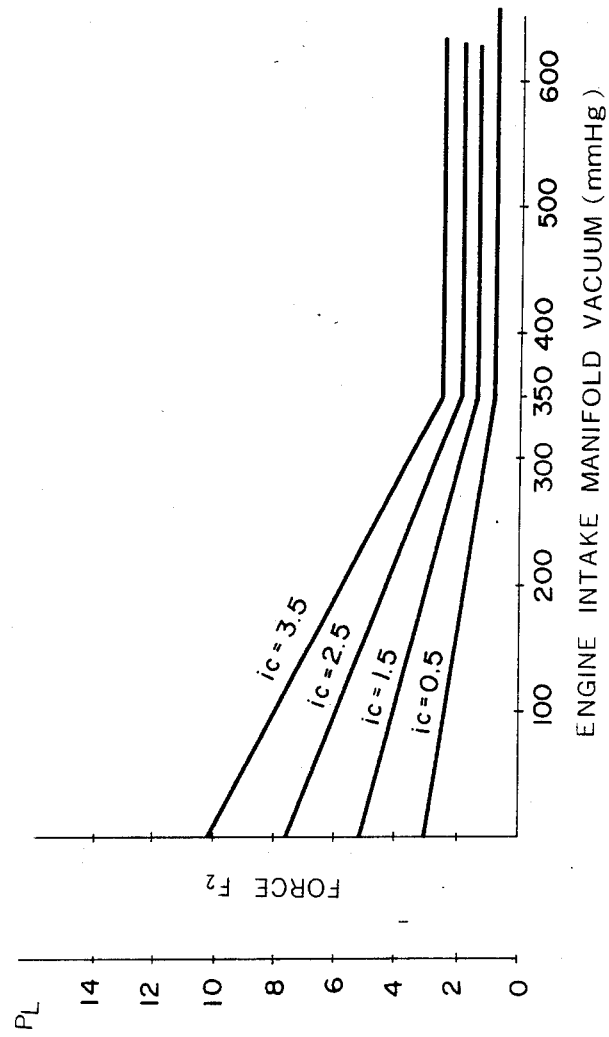

CONTROL APPARATUS AND METHOD FOR ENGINE-CONTINUOUSLY VARIABLE TRANSMISSION

BACKGROUND OF THE INVENTION

1. Field of the Invention

The present invention relates to a control apparatus and method for a motor vehicle having an engine and a continuously variable transmission drivingly connected to the engine.

2. Description of the Prior Art

In motor vehicles having an engine and an ordinary transmission drivingly connected to the engine, if a reduction ratio is selected, the engine is operated at a single rpm for a vehicle speed. With the conventional control apparatus, therefore, the engine is allowed to operate at any revolution speed over the whole operating range for a reduction ratio within the transmission and a driver is allowed to set an operating state of a fuel supply device, for example, a throttle opening degree of a carburetor, to any desired state as he or she desires under any driving state. It is the common practice to use almost all of the possible combinations of engine revolution speed and throttle opening. In the case of engines commonly used in motor vehicles, with various combinations of engine revolution speed and throttle opening, an engine is able to produce the same horsepower output, but fuel consumption rate differs for different combinations. Since according to the conventional control apparatus various combinations of engine revolution speed and operating state of the fuel supply device, for example, a throttle opening degree or an engine intake manifold vacuum corresponding to the throttle opening degree or a fuel supply amount, are used, the engine is operated even in an operating region wherein the fuel consumption rate is bad. This causes an increase in fuel consumption rate, leading to poor energy effeciency.

SUMMARY OF THE INVENTION

According to the present invention there is provided a control apparatus for a motor vehicle having an accelerator pedal, an engine having an intake pipe and a continuously variable transmission drivingly connected to the engine, comprising:

an accelerator pedal sensor means coupled with the accelerator pedal for generating an accelerator pedal stroke electric signal indicative of a depression degree of the accelerator pedal;

an engine revolution speed sensor means coupled with the engine for generating an actual engine revolution speed electric signal indicative of an actual revolution speed of the engine;

means for generating an output electric signal indicative of a target engine revolution speed, said output electric signal generating means including an engine speed function generator means coupled with said accelerator pedal sensor means for generating a first target engine revolution speed electric signal which is a first predetermined function of said accelerator pedal stroke electric signal;

a fuel supply device control function generator means coupled with said accelerator pedal sensor means for generating a target engine torque electric signal indicative of a target engine torque which is a second predetermined function of said accelerator pedal stroke electric signal;

a comparator means coupled with said engine revolution speed sensor means and said output electric signal generating means for generating a deviation signal indicative of a difference between said actual engine revolution speed electric signal and said output electric signal;

a shift control means coupled with said comparator means for varying a reduction ratio in the continuously variable transmission to vary the revolution speed of the engine in a direction to reduce said deviation signal;

a fuel supply device communicating with the intake pipe and including a control element means for adjusting supply of fuel to the engine; and means coupled with said fuel supply device control function generator means for actuating said control element means in response to said target engine torque electric signal.

According to the present invention, the control apparatus further comprises:

a vehicle speed sensor means coupled with the continuously variable transmission for generating a vehicle speed electric signal indicative of a vehicle speed;

a selected shift position sensor means for generating a shift position signal indicative of a selected shift position by a shift lever;

and wherein said output electric signal generating means includes a limit engine revolution speed function generator means coupled with said vehicle speed sensor means for generating a second target engine revolution speed electric signal which is a third predetermined function of said vehicle speed electric signal, and a switching means coupled with said engine revolution speed function generator means, said limit engine revolution speed function generator means and said selected shift position sensor means for allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position.

According to the present invention, said shift control means of the control apparatus comprises:

a shift control valve driver means coupled with said comparator means for generating a first command electric signal in response to said deviation signal;

pumping means for the hydraulic fluid;

means for regulating the fluid supplied by said pumping means to provide a line pressure which varies in direct proportional to the reduction ratio between the drive and driven pulleys and in inverse proportional to an intake manifold vacuum;

a shift control valve means connected to said line pressure regulator valve means to receive said line pressure and coupled with said shift control valve driver means for controlling fluid supply to both of the cylinder chambers and fluid discharge therefrom in response to said first command electric signal.

According to the present invention, the control apparatus includes a safety throttle valve mounted within the intake pipe so as to control the passage area of the intake pipe, and a mechanical means for connecting said safety throttle valve to the accelerator pedal so as to control the opening degree of the safety throttle valve in response to the depression degree of the accelerator pedal such that said safety throttle valve is fully opened before the depression degree of the accelerator pedal becomes maximum.

According to the present invention, there is provided a control method for a motor vehicle having an accelerator pedal, an engine having an intake pipe, a fuel supply device communicating with the intake pipe and including a control element means for adjusting supply of fuel to the engine, and a continuously variable transmission drivingly connected to the engine, comprising:

a step of generating an accelerator pedal stroke electric signal indicative of a depression degree of the accelerator pedal;

a step of generating an actual engine revolution speed electric signal indicative of an actual revolution speed of the engine;

a step of generating an output electric signal indicative of a target engine revolution speed, said step of generating the output electric signal including a step of generating a first target engine revolution speed electric signal which is a first predetermined function of said accelerator pedal stroke electric signal;

a step of generating a target engine torque electric signal indicative of a target engine torque which is a second predetermined function of said accelerator pedal stroke electric signal;

a step of generating a deviation signal indicative of a difference between said actual engine revolution speed electric signal and said output electric signal;

a step of varying a reduction ratio in the continuously variable transmission to vary the revolution speed of the engine in a direction to reduce said deviation signal; and a step of actuating the control element means of the fuel supply device in response to said target engine torque electric signal.

According to the present invention, the control method further comprises:

a step of generating a vehicle speed electric signal indicative of a vehicle speed;

a step of generating a shift position signal indicative of a selected shift position by a shift lever;

and wherein said step of generating the output electric signal includes a step of generating a second target engine revolution speed electric signal which is a third predetermined function of said vehicle speed electric signal, and a step of allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position.

According to the present invention, a desired horsepower of the engine increases as the depression degree of the accelerator pedal indicated by said accelerator pedal stroke electric signal increases, and wherein said first and second predetermined functions define a pair of a value of said target engine torque electric signal and a value of said first target engine revolution speed electric signal for said desired horsepower output, said pair providing an operating condition wherein the engine operates at the least fuel consumption rate for production of said desired horsepower output.

According to the present invention, a desired horsepower output of the engine increases as the depression degree of the accelerator pedal indicated by said accelerator pedal stroke electric signal increases, and wherein said first and second predetermined function define a pair of a value of said control electric signal and a value of said first target engine revolution speed electric signal for said desired horsepower output, said pair providing an operating condition wherein the engine operates at the least fuel consumption rate for production of said desired horsepower output as long as said value of said first target engine revolution speed is higher than a predetermined engine revolution speed, and wherein said first predetermined function defines said predetermined engine revolution speed when an operating condition wherein the engine operates at the least fuel consumption rate for production of said desired horsepower output demands an engine revolution speed lower than said predetermined engine revolution speed.

Accordingly an object of the present invention is to provide a control apparatus and method for a motor vehicle with a continuously variable transmission which is improved in terms of fuel consumption.

BRIEF DESCRIPTION OF THE DRAWINGS

In the accompanying drawings:

FIG. 2B is a block diagram showing a modified portion of the control apparatus shown in FIG. 1 if the invention is applied to a diesel engine;

FIG. 23 is a graph showing the relationship between a force applied to one end of a lever of the line pressure control device shown in FIG. 21 and intake manifold vacuum; and FIG. 24 is a graph showing how a force applied to the other end of the lever and a line pressure vary vs., intake manifold vacuum.

DETAILED DESCRIPTION OF THE INVENTION

Figure 1:
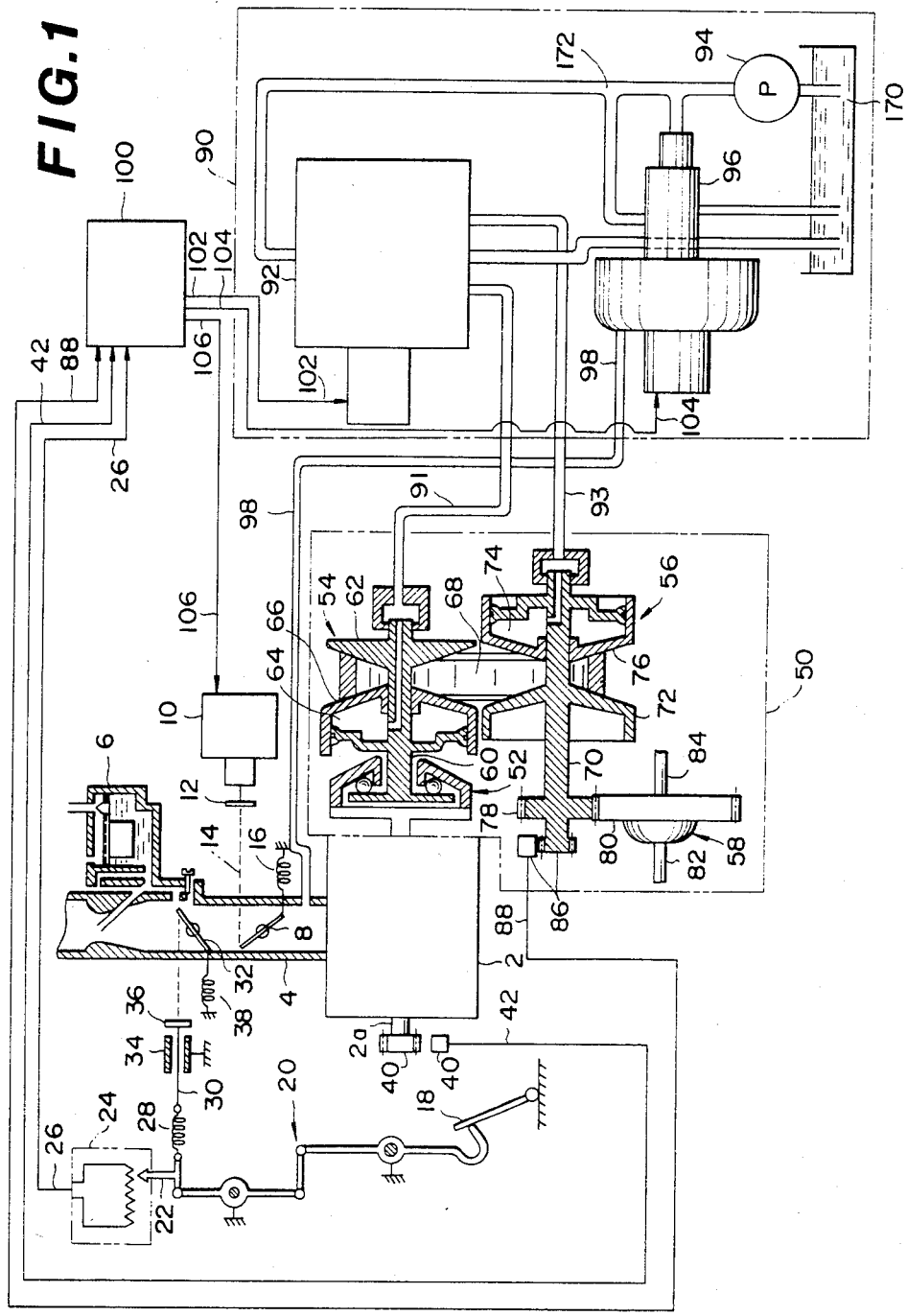
FIG. 1 is a diagrammatic view showing a first embodiment of a control apparatus and method according to the present invention in conjunction with an engine and a continuously variable V-belt transmission.

FIG. 1 illustrates diagrammatically a control apparatus according to the present invention. An intake pipe 4 of an engine 2 has mounted thereon a carburetor 6, and the opening degree of a throttle valve 8 of the carburetor 6, serving as a fuel supply device for controlling the supply of fuel to the intake pipe 4, is adjustable by a throttle valve actuator 10 (which actuator operates in response to an electric signal 106 from a later described electronic control device 100). Although in this embodiment, the fuel supply device is in the form of a carburetor and its throttle valve being controlled, in the case of a diesel engine having no throttle valve, a fuel injection pump serves as the fuel supply device and directly controls the fuel supply. The throttle valve 8 is pulled by the throttle valve actuator 10 via a wire 14 having a stop 12 against a return spring 16. A stroke of an accelerator pedal 18 is transmitted via a link mechanism 20 to a lever 22. Coupled with the lever 22 is a movable portion of an accelerator pedal sensor 24 which serves as a converter converting a displacement to an electric signal, thus allowing the issuance of an electric signal 26 indicative of the stroke of the accelerator pedal 18. The electric signal 26 from the accelerator pedal sensor 24 is sent to the electronic control device 100 which is described later. The lever 22 is connected with a safety throttle valve 32 by a spring 28 and a wire 30, the wire 30 passing through a stationary portion 34 and having a stop 36. The arrangement is such that when the accelerator pedal 18 is depressed by 10% of its full stroke the stop 36 comes into contact with the stationary portion 34 and the opening degree of the safety throttle valve 32 becomes and remains 100% as long as this state exists (the state where the stop 36 is in contact with the stationary portion 34). Accordingly, during the subsequent stroke (10% to 100%) of the accelerator pedal 18, the spring 28 extends under axial tension, allowing the safety throttle valve 32 to remain in the open state. The safety throttle valve 32 is subject to bias force by a return spring 38 tending to close the valve. Mounted on the revolution shaft 2a of the engine 2 is a revolution speed sensor 40 which supplies an electric signal 42 to the electronic control device 100. The revolution of the engine 2 is fed to a continuously variable V-belt transmission 50. The continuously variable V-belt transmission 50 includes a centrifugal clutch 52, a drive pulley 54, a driven pulley 56, and a final drive 58. When the revolution speed exceeds a predetermined value, the centrifugal clutch 52 begins to transmit the revolution of the engine 2 to the drive pulley 54 through the drive shaft 60. The drive pulley 54 includes an axially fixed conical disc fixed to the drive shaft 60 and an axially movable conical disc 66 which is arranged to face the fixed conical disc 62 to define a V-shaped pulley groove and is movable aixally along the drive shaft 60 under the influence of oil pressure acting within a drive pulley cylinder chamber 64. The drive pulley 54 is drivingly connected to a driven pulley 56 by a V-belt 68, and the driven pulley 56 includes an axially fixed conical disc 72 fixed to a driven shaft 70 and an axially movable conical disc 76 which is arranged to face the fixed conical disc 72 to define a V-shaped pulley groove and is movable axially along the driven shaft 70 under the influence of oil pressure acting within a driven pulley cylinder chamber 74. During transmission of rotation from the drive pulley 54 to the driven pulley 56, the ratio of revolution of the drive pulley 54 to that of the driven pulley 56 may be varied by axially displacing the movable conical disc 66 of the drive pulley 54 and the movable conical disc 76 of the driven pulley 56 so as to vary the radius of the contacting curvature of each of the pulleys with the V-belt 68. For example, if concurrently with increasing the width of the V-shaped pulley of the drive pulley 54, the width of the V-shaped pulley groove of the driven pulley 56 is decreased, the radius of the contacting curvature of the drive pulley 54 with the V-belt 68 decreases and the radius of the contacting curvature of the driven pulley 56 with the V-belt increases, thus providing a larger reduction ratio. If the movable conical discs 66 and 76 are displaced inversely to the above case, the reduction ratio becomes small. The driven shaft 70 is connected to output shafts 82 and 84 by reduction gears 78 and 80 of the final drive 58. The driven shaft 70 has mounted thereon a vehicle speed sensor 86 which detects revolution speed of the driven shaft 70 (which corresponds to vehicle speed). The vehicle speed sensor 86 generates an electric signal 88 indicative of the vehicle speed and supplies it to the electronic control device 100. The before mentioned cylinder chamber 64 of the drive pulley 54 and cylinder chamber 74 of the driven pulley 56 are connected to a shift control valve 92 of an oil pressure control device 90 through passage 91 and 93. The operation of the shift control valve 92 is controlled in response to an electric signal 102 from the electronic control device 100. The line pressure supplied to the shift control valve 92 from an oil pump 94 is regulated by the line pressure regulator valve 96. The line pressure regulator valve 96 is controlled in response to an electric signal 104 from the electronic control device 100. The line pressure regulator valve 96 is supplied as a source of power with a vacuum within the intake pipe 4 via a conduit 98. The practical construction of the shift control valve 92 and that of the line pressure regulator valve 96 are explained later. As before described, the electronic control device 100 receives electric signals 26, 42 and 88 from the accelerator pedal 24, engine revolution speed sensor 40 and vehicle speed sensor 86, and based on these electric signals the electronic control device 100 supplies electric signals 106, 102 and 104 to the throttle valve actuator 10, shift control valve 92 and line pressure regulator valve 96, respectively, to control their operations. Next, the construction of this electronic control device 100 is explained.

Figure 2:
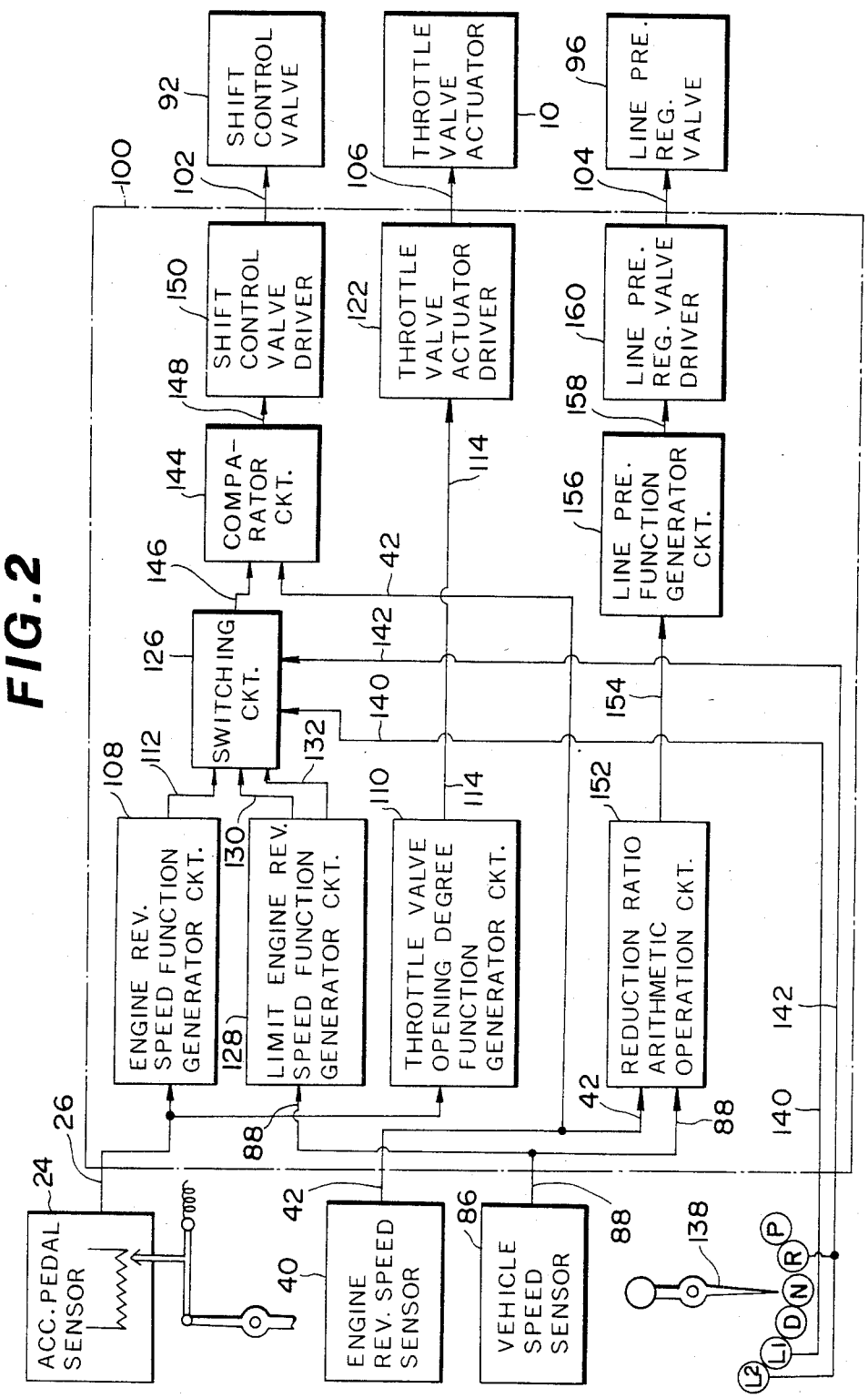
FIG. 2 is a block diagram showing an electronic control device of the control apparatus shown in FIG. 1.
Figure 3:
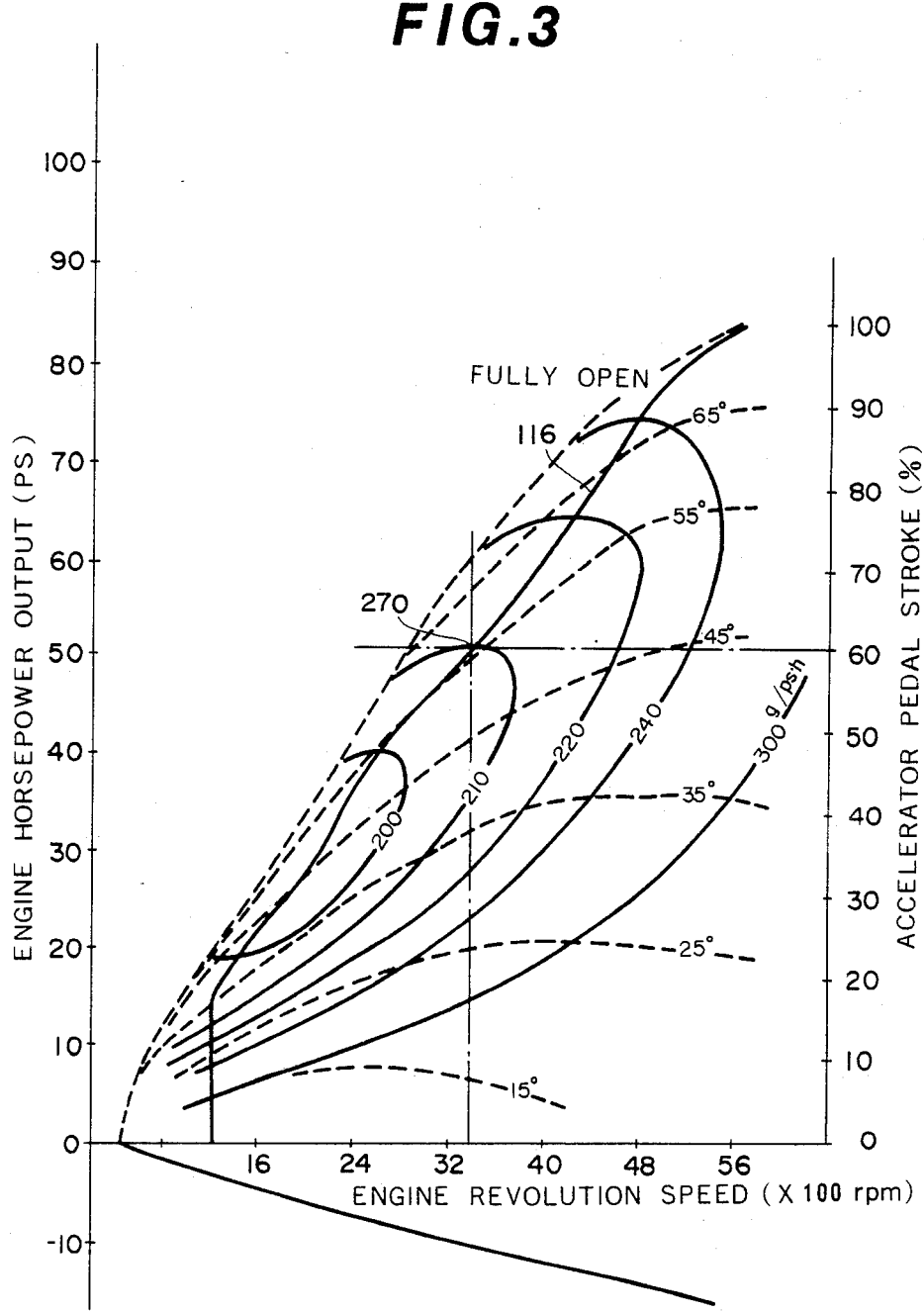
FIG. 3 is a graph showing engine performance curves.
Figure 4:
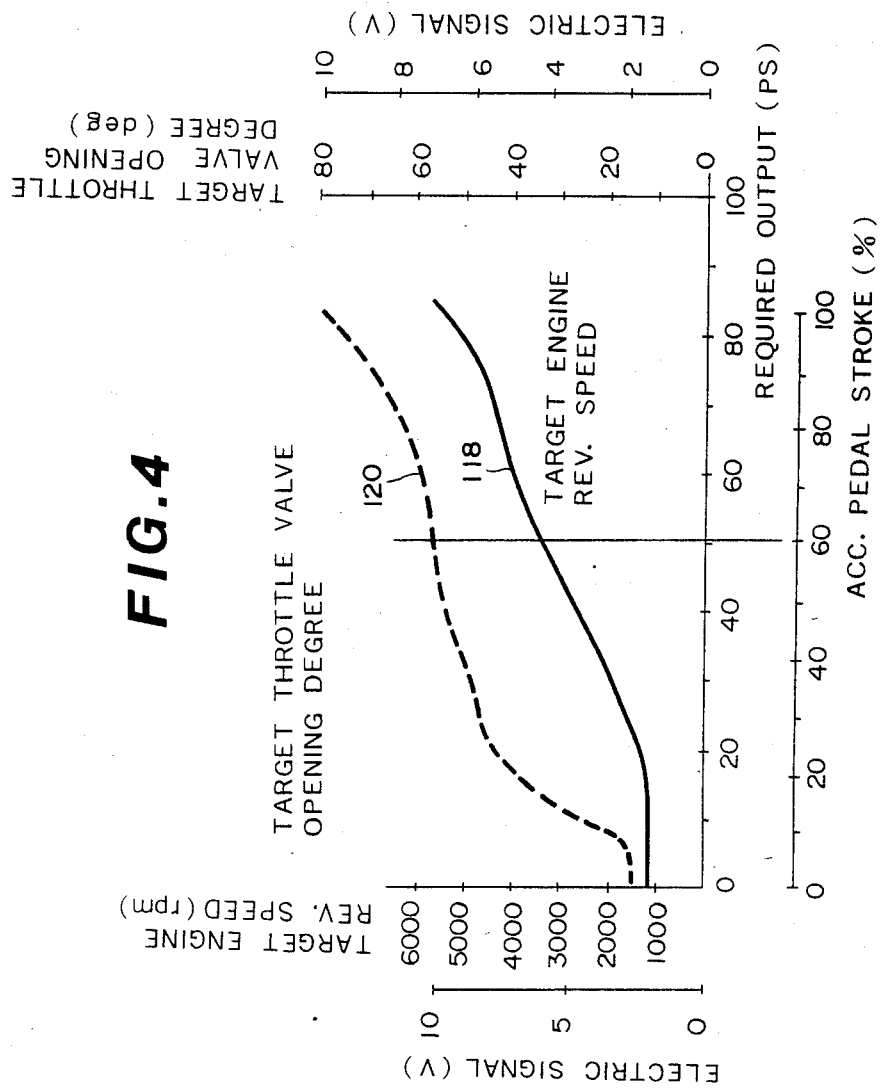
FIG. 4 is a graph showing a target engine revolution speed curve and a target throttle opening degree curve.

FIG. 2 illustrates a block diagram of the electronic control device 100. The electric signal 26 from the above mentioned accelerator pedal sensor 24 is fed to an engine revolution speed function generator circuit 108 of the electronic control device 100 and to a throttle valve opening degree function generator circuit 110 thereof, in each of which a conversion is made using a predetermined function to produce, as an output signal, a target engine revolution speed electric signal 112 in the former case or a target throttle valve opening degree electric signal 114 in the latter case. The above-mentioned functions used in the function generator circuits 108 and 110 are determined as follows. FIG. 3 shows performance curves of the engine 2. The abscissa axis shows engine revolution speed and the ordinate axis, on the lefthand side an engine output horsepower output, a plurality of dotted line curves show engine horsepower output versus engine revolution speed for different throttle valve opening degrees (15°, 25°, 35°, 45°, 55°, 65°, and fully opened). Fine fully drawn curves are iso-fuel consumption rate curves (300, 240, 220, 210, 200 g/ps h). From these iso-fuel consumption rate curves for different engine horsepower output, an operation point is selected wherein the engine operates at the least fuel consumption rate, and such points are interconnected to provide a bold fully drawn curve 116. This curve 116 is called the minimum fuel consumption rate curve, and if the engine 2 is operated on this curve 116, the engine operates at the least fuel consumption rate. The ordinate axis on the righthand side, shows accelerator pedal stroke wherein the accelerator pedal stroke 100% corresponds to the maximum engine horsepower output (84 ps) and the accelerator pedal stroke 0% corresponds to horsepower output 0 (zero). The accelerator pedal stroke does not mean the actual opening degree of the throttle valve 8 and indicates no more than the stroke of the accelerator pedal 18, meaning how much the driver demands engine horsepower output. For example, an accelerator pedal stroke 60% indicates the intention of the driver that he demands 60% of the maximum horsepower output of the engine for driving the vehicle. If the engine revolution speeds and throttle opening degrees on the minimum fuel consumption rate curve 116 are plotted on a graph with the abscissa axis having thereon accelerator pedal stroke, curves 118 and 120 as shown in FIG. 4 are obtained. Therefore, if the engine revolution speed is varied along the curve 118 against the variation in the accelerator pedal stroke and the throttle valve opening degree along the curve 120 against the variation in the accelerator pedal stroke, the engine always operates on the minimum or least fuel consumption rate, viz., on the minimum fuel consumption rate curve 116. The curves 118 and 120 illustrate the functions used in the engine revolution speed function generator circuit 108 and throttle valve opening degree function generator circuit 110, respectively. Therefore, if the target engine revolution speed electric signal 10 V is set as a value corresponding to the target engine revolution speed 5600 rpm and the target throttle valve opening degree electric signal 10 V is set as a value corresponding to the fully opening degree (80°) of the throttle valve, the engine revolution speed function generator circuit 108 and throttle valve opening degree function generator circuit 110 generates 6.0 V and 7.2 V as output signals thereof, respectively, when the accelerator pedal stroke is 60%. As the function generator circuits 108 and 110 which convert the electric signal (electric voltage) from the accelerator pedal sensor 24 along the predetermined functions shown in FIG. 4 into output electric signals (electric voltages), i.e., the target engine revolution speed electric signal 112 and target throttle valve opening degree electric signal 114, XY function generators of the ordinary type may be used, or a read only memory of a microcomputer may be used to store the above mentioned functions.

As shown in FIG. 3, the curve 116 (the iso-fuel consumption rate curve) rises vertically at 1200 rpm because, when the engine rotates below this engine rpm, the vibration of the engine torque exceeds an allowable vibration limit and the use of the engine below this engine rpm is not practical. In other words, although the actual iso-fuel consumption rate curve extends below 1200 rpm, emphasis is placed on prevention of vibration rather than reduction of fuel consumption rate within this operating range in controlling the engine.

The target throttle valve opening degree electric signal 114, which instructs a target throttle valve opening degree, from the throttle valve opening degree function generator circuit 110 is fed to the throttle valve actuator driver 122. The actuator driver 122 is responsive to this electric signal 114 to generate an electric command signal 106 which is fed to drive the throttle valve actuator 10 to cause it to set the throttle valve 8 to the target throttle valve opening degree determined by the target throttle valve opening degree signal 114. The throttle valve actuator 10 is in the form of an electric servo motor of the ordinary type, but it may take the form of a hydraulic or pneumatic positioning device.

Figure 5:
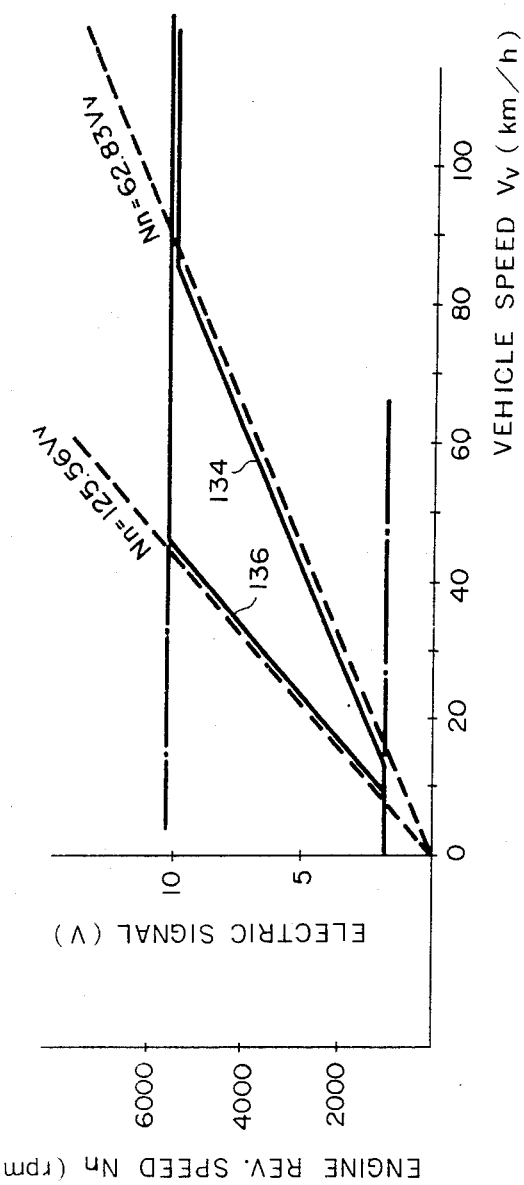
FIG. 5 is a graph showing two different electric signals generated by a limit engine revolution speed function generator circuit.

The target engine revolution speed electric signal 112, which innstructs a target engine revolution speed, from the target engine revolution speed function generator circuit 108 is fed to a switching circuit 126. Also fed to the switching circuit 126 are electric signals 130 and 132 from a limit engine revolution speed function generator circuit 128. The limit engine revolution speed function generator circuit 128 generates the electric signal 130 which varies as shown by a fully drawn line 134 broken as shown in FIG. 5 and the electric signal 132 which varies as shown by a solid line 134 broken as shown in FIG. 5. These signals 130 and 132 are fed to the switching circuit 126. These electric signals 130 and 132 (each in the form of an electric voltage) are indicative of the engine revolution speed as shown on the axis of ordinate on the lefthand side of FIG. 5. Fed also to the switching circuit 126 are an electric signal 140 indicating that a shift lever 138 of the continuously variable transmission 50 is set to a L1 position (i.e., a position wherein the transmission is locked in a predetermined reduction ratio for weak engine braking) and an electric signal 142 indicating that the shift lever 138 is set to a L2 position (i.e., a position wherein the transmission is locked in another predetermined reduction ratio for strong engine braking) or to a R position (reverse position). The switching circuit 126 supplies to the comparator circuit 144 the electric signal 112 as an output signal thereof when it is not fed with the electric signals 140 and 142 from the shift lever 138 (i.e., when the shift lever 138 is set to the P position of the N position or the D position); the electric signal 130 from the limit engine revolution speed function generator circuit 128 when it is fed with the electric signal 140 (i.e., when the shift lever 138 is set to the L1 position); and the electric signal 132 from the limit engine revolution speed generator circuit 128 when it is fed with the electric signal 142 (when the shift lever 138 is set to the L2 position). The output electric signal 146 (one of the electric signals 112, 130 and 132) as mentioned above from the switching circuit 126 is supplied to the comparator circuit 144. The comparator circuit 144 compares the output electric signal with the actual engine revolution speed electric signal 42 indicative of the actual engine revolution speed from the engine revolution speed sensor 40 and supplies an electric signal 148 indicative of a deviation between both of the electric signals 146 and 42 to the shift control valve driver 150. The shift control valve driver 150 supplies an electric command signal 102 to the shift control valve 92 to drive same in a manner to reduce the deviation toward 0 (zero).

Fed to a reduction ratio arithmetic operation circuit 152 are the actual engine revolution speed electric signal 42 from the engine revolution speed sensor 40 and the vehicle speed electric signal 88 from the vehicle speed sensor 86 so as to perform arithmetic operation to provide a current reduction ratio of the continuously variable transmission 50. The reduction ratio provided by the arithmetic operation is fed in the form of an electric signal 154 to the line pressure generator circuit 156. The line pressure function generator circuit 156 converts this electric signal using a predetermined function and then supplies the thus converted electric signal 158 to the line pressure regulator valve driver 160. The line pressure regulator valve driver 160 suppies an electric command signal 104 to the line pressure regulator valve 96 to drive same. The line pressure should be set such that it increases with increasing reduction ratio and with increasing output torque of the engine (with decreasing intake manifold vacuum). This has been accomplished by the line pressure function generator circuit 156 which converts the electric signal 154 into the electric signal 158 indicative of an oil pressure determined depending upon the reduction ratio. Further explanation of this is made later. With the conduit 98 (see FIG. 1) the intake manifold vacuum is introduced to the line pressure regulator valve 96. Thus, the line pressure is controlled to vary depending upon the intake manifold vacuum, too.

Explanation is hereinafter made of the oil pressure control device 90. As shown in FIG. 1, oil within a tank 170 is discharged by an oil pump 94 and is supplied to the line pressure regulator valve 96 and the shift control valve 92. The line pressure regulator valve 96 which regulates the oil pressure in the passage 172 to a desired pressure is specifically illustrated in FIG. 6. Within a valve bore 176 of a valve body 174, a spool 178 having a large diameter portion 178a and a small diameter portion 178b is disposed and the spool is subjected to a rightward force of a spring 180 viewing in this Figure. A chamber 182 disposed on the righthand side of the small diameter portion 178b of the spool communicates with a passage forming part of a line pressure circuit, and a port 184 mating with the large diameter portion 178a communicates with the passage 172. A chamber 186 defined between the large diameter portion 178a of the spool 178 and small diameter portion 178b of the spool 178 is drained via a drain passage 188. A vacuum chamber 192 defined by a diahragm 190 is arranged on the lefthand side of the spool 178, which vacuum chamber 192 communicates with the intake pipe 4 of the engine via the before mentioned conduit 98. A push rod 194 attached to the diaphragm 190 is biased by a spring 196 into contact with the left end of the spool 178. To the left of the vacuum chamber 192 is arranged a solenoid 198 which has a push rod 200 thereof extending through the hollow portion of the push rod 194 and in contact with the left end of the spool 178 under the action of a spring 202. With this construction, the spool 178 is subjected to a leftwardly directed force by the line pressure within the chamber 182 applied to push the small diameter portion 178b of the spool and a rightwardly directed force by the spring 180, by the push rod 194 and by the push rod 200, and the opening degree of the port 184 is regulated to a degree wherein the both opposed forces are balanced, thus regulating the pressure in the passage 172. The oil pressure within the passage 172, i.e., the line pressure, therefore increases with increase in the pushing forces by the push rods 194 and 200. Since the pushing force by the push rod 194 decreases with increase in the vacuum in the vacuum chamber 192, the line pressure is inversely proportional to the intake manifold vacuum in the intake pipe 4. Further, since the pushing force by the push rod 200 decreases with increase in drawing force by the solenoid 198, the line pressure is inversely proportional to the electric current force through the solenoid 198. The electric command signal 104 is in the form of an electric current passing through the solenoid 198. This electric current varies in such a manner as to cause the line pressure to increase with increase in reduction ratio. Therefore, the line pressure is controlled to increase with increasing output torque of the engine and with increasing reduction ratio.

Figure 7:
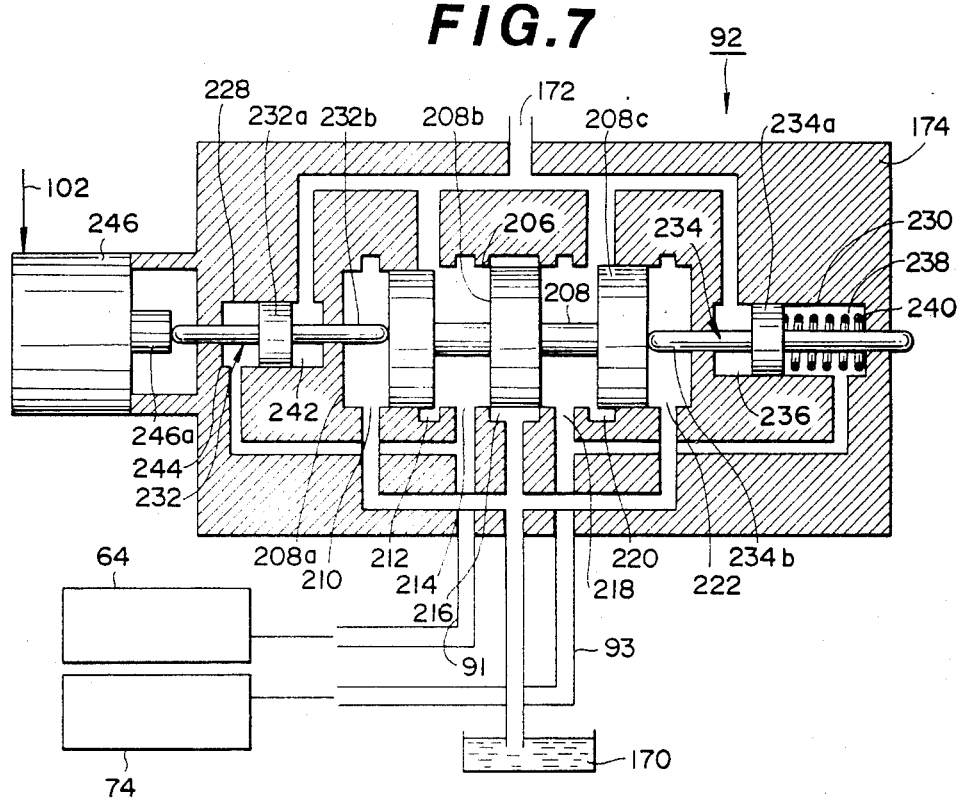
FIG. 7 is a cross sectional view of a shift control valve.

The shift control valve 92 to be supplied with the thus regulated line pressure generated by the above mentioned line pressure regulator valve 96 is explained specifically in connection with FIG. 7. Within a valve bore 206 of a valve body 174 is disposed a spool 208 having three same diameter lands 208a, 208b and 208c. The valve bore 206 has seven ports 210, 212, 214, 216, 218, 220 and 222, wherein the left and right edge ports 210 and 222 and the center port 216 are drained toward the tank 170. The port 212 communicates with the port 220 and they are supplied with the line pressure. The port 214 communicates via the passage 91 with the before mentioned drive pulley cylinder chamber 64, and the port 218 communicates via the passage 93 with the before mentioned driven pulley cylinder chamber 74. The ports 212 and 220 are arranged such that when the center land 208 assumes a position wherein it agrees with the port 216, the ports 212 and 220 are uncovered by the lands 208a and 208c respectively, forming clearances communicating with the ports 214 and 218, respectively. Therefore, moving the spool rightwardly from this middle position results in a reduction in oil pressure in the port 214 and an increase in oil pressure in the port 218. Inversely, moving the spool 214 leftwardly results in an increase in oil pressure in the port 214 and a reduction in oil pressure in the port 218. Located on the both sides of the valve bore 206 are valve bores 228 and 230 receiving a spool 232 with a land 232a and a spool 234 with a land 234a, respectively, with their rods 232b and 234b contacting with both ends of the spool 208, respectively. A chamber 236 defined on the lefthand side of the valve bore 230 by the spool 234 communicates with the passage 172, and the chamber 238 on the righthand side communicates with the passage 93. The spool 234 is biased leftwardly by a spring 240. A chamber 242 defined on the righthand side of the valve bore 228 by the spool 232 communicates with the passage 172, and a lefthand side chamber 244 communicates with the passage 91. The spool 232 is arranged to be biased rightwardly by the push rod 246a of the solenoid 246.

Figure 8:
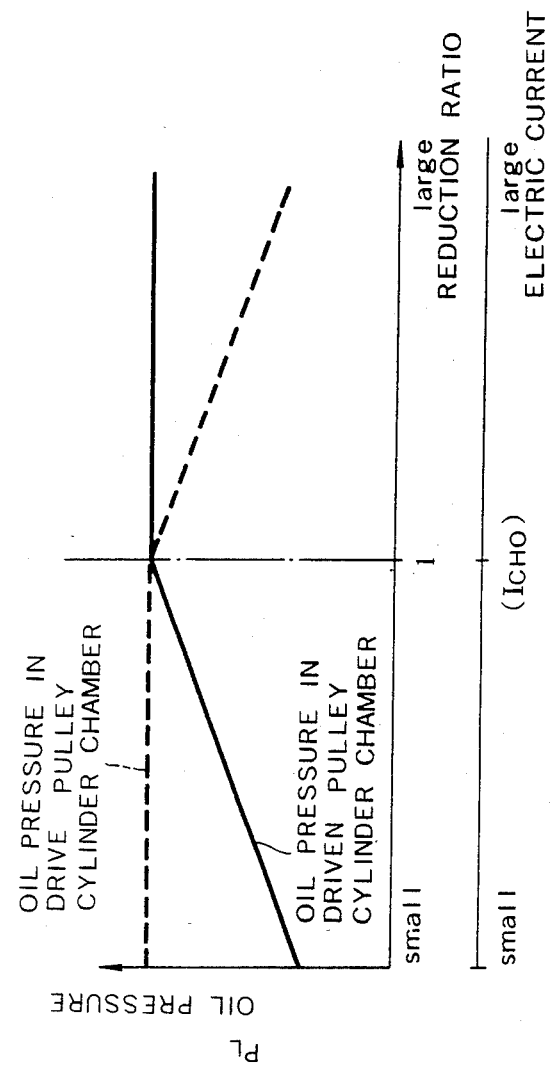
FIG. 8 is a graph showing how oil pressure within a drive pulley cylinder chamber and that within a driven pulley cylinder chamber vary against an increase or decrease in an electric current passing through a solenoid of the shift control valve from a reference electric current ($I_{CH0}$)

If, by passing an electric current through the solenoid 246, there is produced a pushing force strong enough to balance with a pushing force of the spring 240, the spool 208 assumes the middle position as shown in FIG. 7, thus permitting the oil pressure in the port 214 and that in the port 218 to agree with each other. That is, the oil pressure in the drive pulley cylinder chamber 64 is equal to that in the driven pulley cylinder chamber 74, thus providing a reduction ratio of 1. If the electric current passing through the solenoid 246 is increased in this state, the spool 208 is pushed through the spool 232 by the push rod 246a of the solenoid 246 to be moved rightwardly by a small amount. This movement of the spool 208 causes the land 208b to form a clearance opening into the drain port 216, causing a reduction in oil pressure in the port 214. Since the port 214 communicates with the lefthand side chamber 244 of the spool 232, oil pressure within the lefthand side chamber 244 also reduces. Since the line pressure is always supplied to the righthand side chamber 242 of the spool 232, the spool 232 is subjected to a leftwardly directed force which is proportional to the reduction in oil pressure within the chamber 244. This leftwardly directed force balances with the increased amount of electric current passing through the solenoid 246. This means that increasing the electric current passing through the solenoid 246 results in a reduction in oil pressure within the chamber 244 (i.e., the oil pressure at the port 214). The oil pressure within the port 218 is maintained at the level of the line pressure. This causes a reduction in oil pressure in the drive pulley cylinder chamber 64, allowing the reduction ratio to become large in the continuously variable transmission 50. If the electric current passing through the solenoid 246 is decreased, the reduction ratio is allowed to become small as a result of a similar operation of the spool 234. FIG. 8 shows how the oil pressure varies with the above mentioned change in electric current passing through the solenoid 246. In the above manner, the reduction ratio is varied only by controlling the electric current passing through solenoid 246.

Figure 9:
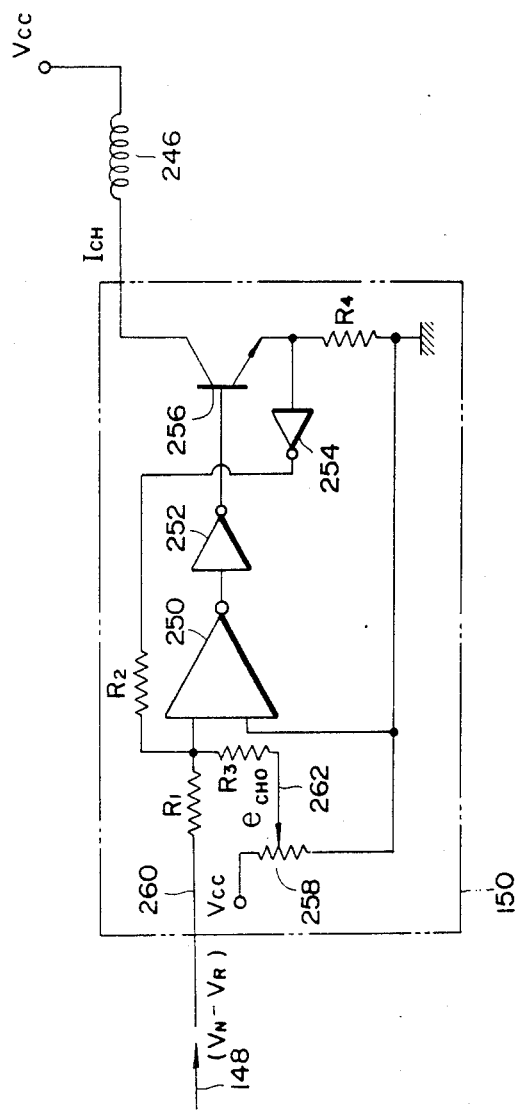
FIG. 9 is a circuit diagram showing a second form of a shift control valve driver.

The detailed construction of the above mentioned shift control valve driver 150 that supplies electric current to the above mentioned solenoid is explained in connection with FIG. 9. As illustrated, the shift control valve driver 150 is an electric circuit constructed by interconnecting an OP amplifier 250, an inversion amplifiers 252 and 254, each having a gain 1, a transistor 256, resistors R1, R2, R3 and R4, and a potentiometer 258. Fed to the signal line 260 that is connected to one terminal of the resistor R1 is an electric signal 148 (i.e., a deviation ($V_N - V_R$) between the electric voltage $V_N$ indicative of the target engine revolution speed and the electric voltage $V_R$ indicative of the actual engine revolution speed) from a comparator circuit 144, and connected to one terminal of the transistor 256 is the before mentioned shift control solenoid 246. The potentiometer 258 is so adjusted that an electric voltage $e_{CHO}$ appears on the signal line 262. If, in this circuit, the electric current passing through the solenoid 246 is set as $I_{CH}$, the relation is defined by the following equation.

$$I_{CH} \cdot R4 = \frac{R2}{R1}(V_N - V_R) + \frac{R2}{R3} \cdot e_{CHO}.$$

From this equation we have, $$I_{CH} = \frac{R2}{R1\,R4}(V_N - V_R) + \frac{R2}{R3\,R4} \cdot e_{CHO}.$$

Since, $$\frac{R2}{R3\,R4} \cdot e_{CHO}$$

is constant, the pushing force of the solenoid 246 when this electric current flows therethrough balances with the force of the spring 240 (i.e., the spool takes the middle position). If $$\frac{R2}{R3\,R4} \cdot e_{CHO}$$

is expressed as $I_{CHO}$ (reference electric current), $$I_{CH} = \frac{R2}{R1\,R4}(V_N - V_R) + I_{CHO}.$$

As will be understood from this equation, the electric current $I_{CH}$ flowing through the solenoid 246 is composed of the reference electric current $I_{CHO}$ and an electric current proportional to the deviation ($V_N - V_R$). Therefore, if the $V_N - V_R > 0$ (i.e., in the case the target engine revolution speed is greater than the actual engine revolution speed), $I_{CH} > I_{CHO}$ holds, resulting in an increase in the pushing force of the solenoid 246, causing a decrease in the oil pressure within the drive pulley cylinder chamber 64 as shown in FIG. 8, thus allowing the reduction ratio to become large to decrease the deviation ($V_N - V_R$) finally into zero. If, on the contrary, $V_N - V_R < 0$, the oil pressure within the driven pulley cylinder chamber 74 decreases to allow the reduction ratio to become small. The continuously variable transmission is controlled in such a manner as to decrease the deviation $V_N - V_R$, i.e., to maintain the actual engine revolution speed as being equal to the target engine revolution speed.

Having about described about the construction and operation of the engine 2, the continuously variable transmission 50, the oil pressure control device 90, and the electronic control device 100 to which the present invention is applied, the operation of the drive system as a whole is explained again.

It is now assumed, as an example, that the driver has depressed the accelerator pedal to the extent of 60% of the full stroke when the shift lever 138 is set to D position. (As will be seen from FIGS. 3 and 4, an engine horsepower output corresponding to the accelerator pedal stroke 60% is 50.4 ps, the engine revolution speed Nn is 3370 rpm, and the throttle valve opening degree is 57.0° at the corresponding point 270 on the minimum fuel consumption rate curve to this horsepower.) The electric signal 26 (indicating that the accelerator pedal stroke is 60%) generated by the accelerator pedal sensor 24 is converted by the throttle valve opening degree function generator circuit 110 into the electric signal 114 which indicates that the throttle valve opening degree is 57.5°, and based on this electric signal 114 the throttle valve actuator driver 122 actuates the throttle valve actuator 10 to set the throttle valve 8 to the throttle valve opening degree of 57.5°. The electric signal 26 from the accelerator pedal sensor 24 is converted by the engine revolution speed function genrator circuit 108 to the electric signal 112 which indicates an engine revolution speed of 3370 rpm. The electric signal 112 is red to the switching circuit 126, but, since the shift lever 138 is set to the D position, it is issued as an electric signal 146 therefrom and compared at the comparator circuit 144 with the actual engine revolution speed electric signal 42 from the engine revolution speed sensor 40 to provide the deviation which is sent out in the form of electric signal 148 to the shift control valve driver 150, causing the shift control valve driver 150 to operate the shift control valve 92 in such a manner as to decrease the deviation. Let us now calculate the reduction ratio ic to which the control is made by using the practical values. Symbolically expressing:

- ic . . . reduction ratio
- rw . . . tire radius (=0.287 m)
- Nn . . . engine revolution speed (rpm)
- id . . . final reduction ratio (=3.889)
- Vv . . . vehicle speed (Km/h), we have $$ic = \frac{120\pi \cdot rw \cdot Nn}{1000 \, id \, Vv} = 0.02783 \frac{Nn}{Vv} \quad (1)$$

Now, if Nn=3370 rpm, we have $$ic = 93.8/Vv.$$

Figure 10:
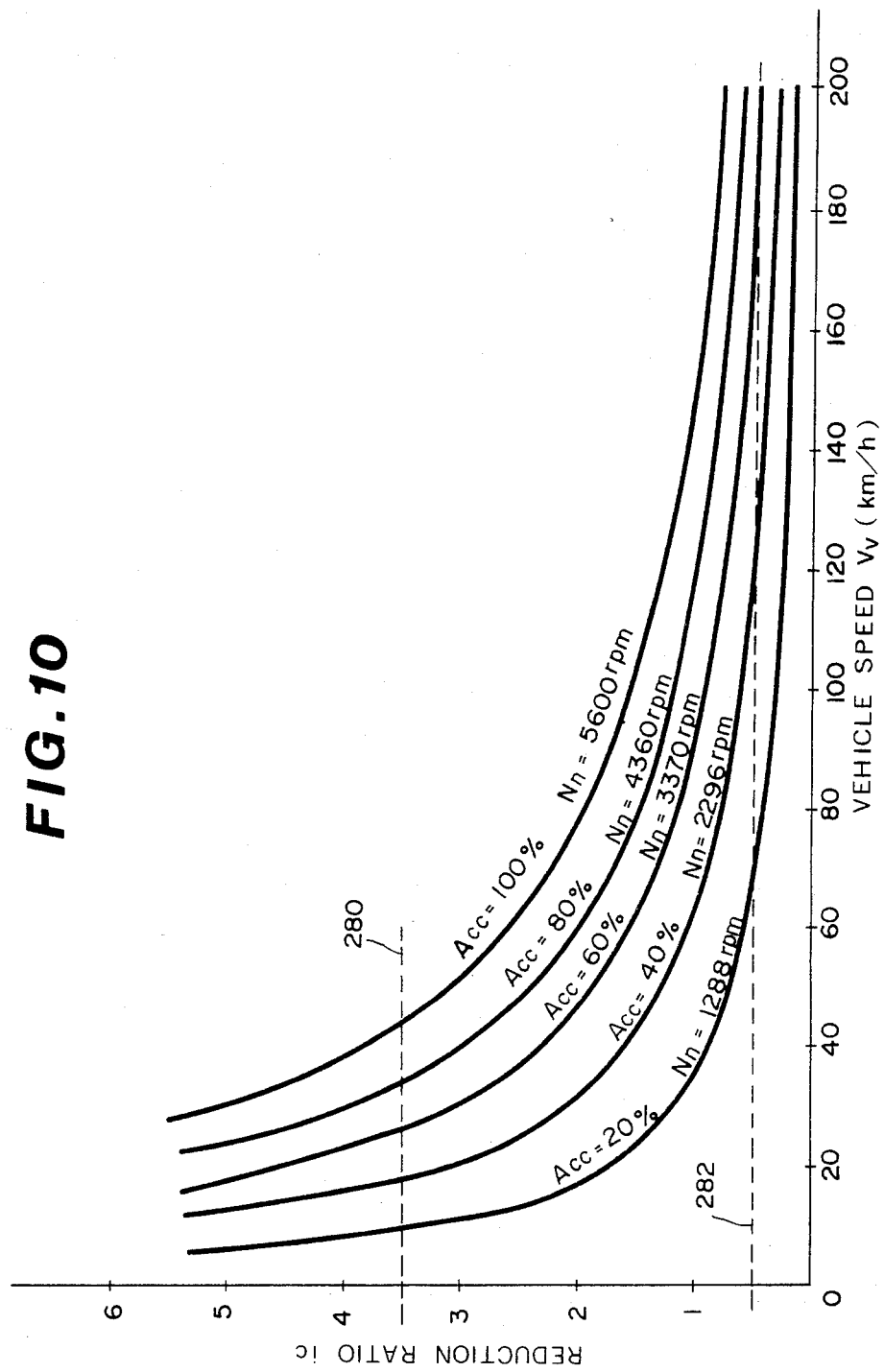
FIG. 10 is reduction ratio vs., vehicle speed characteristic for different combinations of accelerator pedal stroke (Acc) with engine revolution speed (Nn)

The relation defined by this equation is illustrated in FIG. 10 with Vv on the axis of abscissa and ic on the axis of ordinate (Similar calculations were made as to the cases other than the particular case wherein the accelerator stroke (Acc) is 60% and the calculated results are shown.) If the reduction ratio of the continuously variable transmission 50 is set within a range from 0.5-3.5, a range between middle lines 280 and 282 in FIG. 10 becomes available for actual use.

Next, the determination is made how much driving force is produced for different vehicle speeds. Expressing:

- f . . . transmission efficiency of the overall transmission system
- H . . . engine horsepower output (ps)
- Fn . . . driving force (Kg)
- Vv . . . vehicle speed (Km/h), then $$f \cdot H = \frac{Fn \times 1000 Vv}{75 \times 3600}$$

and if f=0.85

$$Fn = 229.5 \, (H/Vv)$$

If Acc=60%, H=50.4ps, so that $$Fn = 11567/Vv$$

Figure 11:
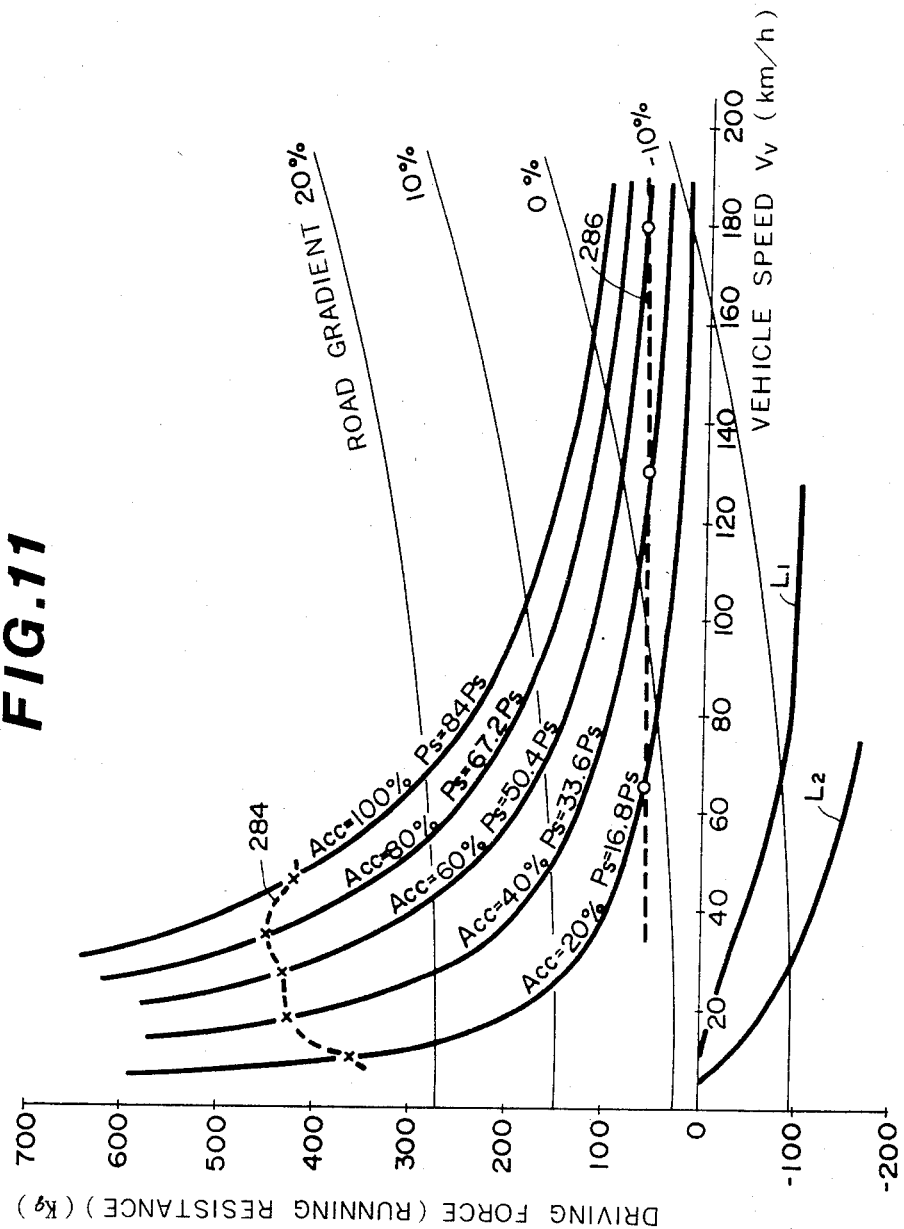
FIG. 11 is a graph showing driving force vs., vehicle speed characteristic for different accelerator pedal strokes (Acc) corresponding to engine horsepower outputs, and running resistance vs., vehicle speed characteristic for different road gradients.

The relation defined by this equation is illustrated in FIG. 11. (Similar calculations were made as to cases other than the particular case wherein Acc=60% and the calculated results are shown.) However, since the setting is made that the usable range in reduction ratio is from 0.5 to 3.5, not all of the range on the curves are usable. As will be understood from FIG. 10, an usable range in vehicle speed when Acc=60% is from 27 to 180 Km/h, and the upper limit of this range and the lower limit thereof are illustrated by a sign x and a sign o in FIG. 11, respectively. A curve 284 interconnecting the lower limit values for different accelerator pedal strokes and a curve 286 interconnecting the upper limit values for different acclerator pedal strokes define therebetween an operating range within which the vehicle is allowed to operate on the minimum fuel consumption rate curve. From comparison of this controllable range with the running resistance due to the gradient of a road, it will be understood that it can be controlled under most of the running conditions. It does not mean that the running operation of the vehicle ceases outside of the above-mentioned controllable range and what occurs is to fix the reduction ratio to 3.5 when the vehicle speed is below the lower limit curve 284 and to 0.5 when the vehicle speed is above the upper limit curve 286, thus allowing the engine revolution speed to vary in proportional to the vehicle speed (that is, the operating condition deviates from the minimum fuel consumption rate curve).

Explanation is made as to the operation when the shift lever 130 is set to L1 position. Setting the shift lever 138 to the L1 position causes the switching circuit 126 to establish a state wherein the electric signal 130 from the limit engine revolution speed function generator circuit 128 is permitted to be transmitted to the comparator circuit 144. The electric signal 130 has a characteristic as shown by the broken line 134 in FIG. 5, and if the conversion is made from this output electric voltage to the engine revolution speed at the same rate (viz., at the rate 10 V=5600 rpm) as employed in the case of the engine revolution speed function generator circuit 108, the result is obtained as illustrated on the axis of ordinates on the lefthand side of FIG. 5. If the slope portion of the broken line 134 is expressed as a function of vehicle speed Vv and engine revolution speed Nn, $$Nn = 62.83 Vv.$$

Similarly to the above-mentioned case, the comparator circuit 144 and shift control valve driver 150 operate in a manner as to keep this relation. Substituting this equation into the before mentioned equation (1), we have ic=1.75. This means that the engine revolution speed is always controlled to maintain the reduction ratio as 1.75. Therefore, we can obtain relatively weak engine braking (in a state where the accelerator pedal stroke is small). Since the broken line 134 becomes constant at the upper limit (5600 rpm) and constant at the lower limit (1000 rpm), the engine revolution speed will not jump outside of this range. That is, even if, under running condition at a vehicle speed above 85 Km/h, the shift lever 138 is moved to the L1 position, the engine is controlled to maintain an engine revolution speed of 5600 rpm, thus preventing the engine from overrunning. Since the engine revolution speed of 1000 rpm is maintained when the vehicle is running at a speed below 15 Km/h, the reduction ratio larger than 1.75 is maintained when the vehicle is started from the standstill with the shift lever 138 set to L1 position, allowing the vehicle to start smoothly even when the L1 position is selected.

In the case the shift lever 138 is moved to L2 or R position, we get Nn=125.56Vv and thus ic=3.5, thus providing strong engine braking. In this case, too, the upper limit value (5600 rpm) and lower limit value (1000 rpm) are set for the same reason mentioned above.

Brief explanation is made hereinafter as to the safety throttle valve 32. As mentioned before, since the throttle valve 8 is controlled by the throttle valve actuator 10, there would happen a dangerous case that the throttle valve is opened against the intention of the driver if the electronic control device 100 and/or throttle valve actuator 10 become out of order. The occurrence of this dangerous case could be avoided by manipulating the accelerator pedal to maintain the accelerator pedal stroke as 0% to close the safety throttle valve 32 to provide an ordinary idle state. Besides, in this case, the vehicle can be kept running for emergency by controlling the opening degree of the safety throttle valve 32 by manipulating the accelerator pedal 18. Since the safety throttle valve 32 is designed to be fully opened when the accelerator pedal 18 is depressed to the stroke of 10% of the full stroke, the engine is controlled in the ordinary state by the opening degree of the throttle valve 8 as long as the accelerator pedal 18 is operated beyond the stroke of 10%.

Figure 12:
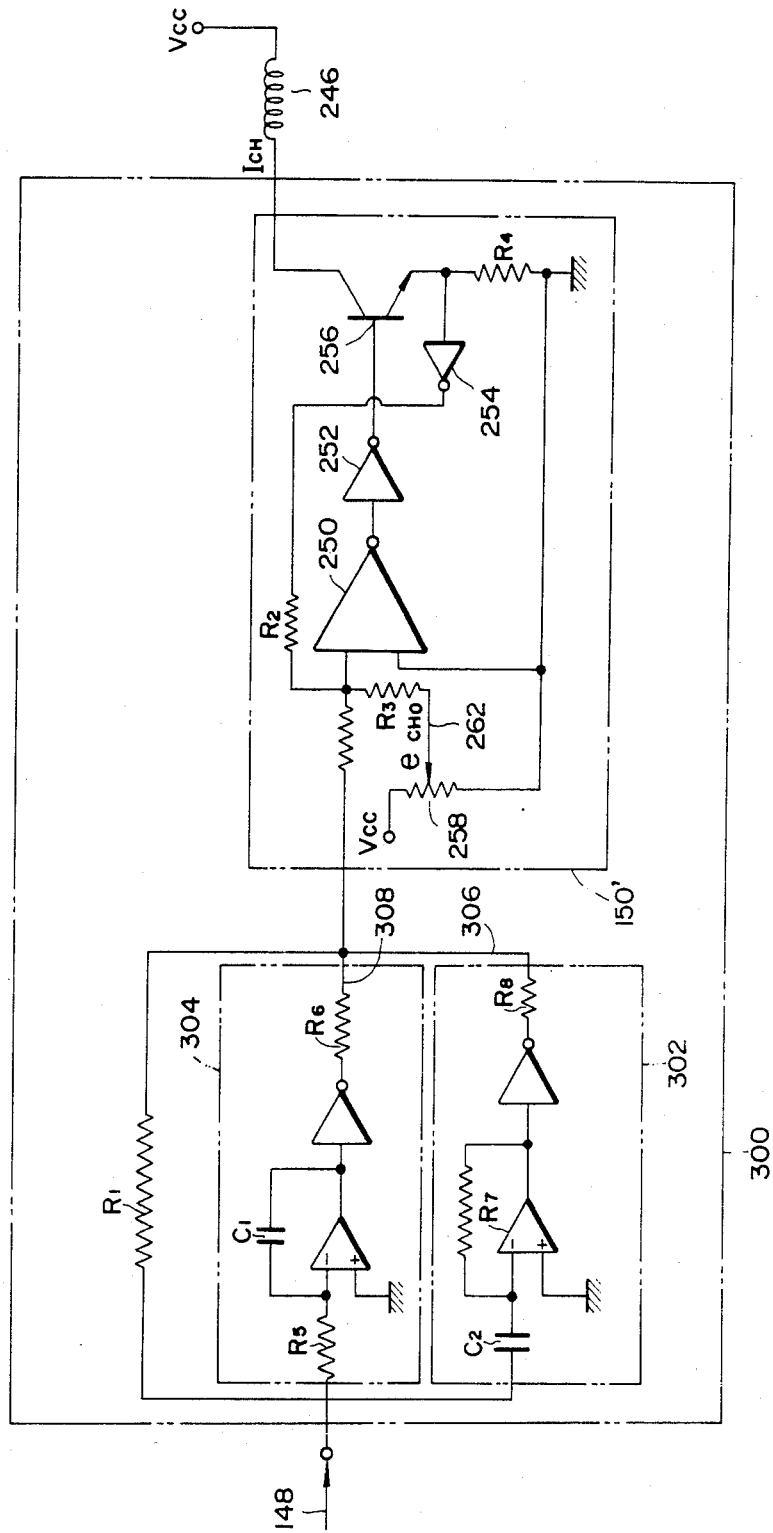
FIG. 12 is a circuit diagram showing a second form of a shift control valve driver.

The shift control valve driver 150 used in the embodiment thus far described may be replaced with a shift control valve driver 300 as shown in FIG. 12. This shift control valve driver 300 is different from the shift control valve driver 150 in the addition of a differentiator circuit 302 and an integrator circuit 304. In other words, a circuit 150' is substantially the same as the shift control valve driver 150, and the circuit 150' is fed with the electric signal 148 (deviation $V_N - V_R$), an electric signal 306 resulting from differentiating the electric signal 148, and an electric signal 308 resulting from integrating the electric signal 148 with suitable weights thereon, respectively, after they are added to each other. The operation of this shift control valve 300 of this construction is the same as that of the before mentioned shift control valve driver 150 in the static state, but the differentiator circuit 302 provides an additional effect as follows: If the accelerator pedal 18 is depressed rapidly, the electric signal 148 changes quickly as compared to the case wherein the accelerator pedal 18 is depressed slowly, causing the electric signal 306 generated by the differentiator circuit 302 to increases. Therefore, the greater amount of the electric signal is fed to the circuit 150', thus increasing the electric current flowing through the solenoid 246 accordingly, causing the shift control valve 92 to respond quickly to the change in the reduction ratio. It follows that the operation state of the engine follows closely to the manipulation of the accelerator pedal by the driver, thus enhancing the driveability of the vehicle. The integrator circuit 304 provides an effect as follows: If, owing to an error in the shift control valve 92 and an error in oil pressure acting within the pulley cylinder chambers 64 and 74, there remains a steady-state deviation in the electric signal 148 (deviation $V_N - V_R$) which is relatively small in amount, the integrator circuit 304 accumulates the remained steady-state deviation and sends out as the result in the form of electric signal 308 to the circuit 150', causing the solenoid 246 to operate in such a manner as to reduce the steady-state deviation. It follows that the more accurate control is carried out, thus making it possible to operate the engine on the minimum fuel consumption rate curve, i.e., target of the control.

Although, in the embodiment described so far, a throttle valve opening degree is used as a target value and the throttle valve 8 of the carburetor 6 is adjusted to the target throttle valve opening degree indicated by the electric signal 114 generated by the throttle valve opening degree function generator circuit 110, it is possible to use an intake manifold vacuum as the target value and to adjust the throttle valve 8 in such a manner as to decrease a deviation between an actual intake manifold vacuum and a target intake manifold vacuum.

Figure 2A:
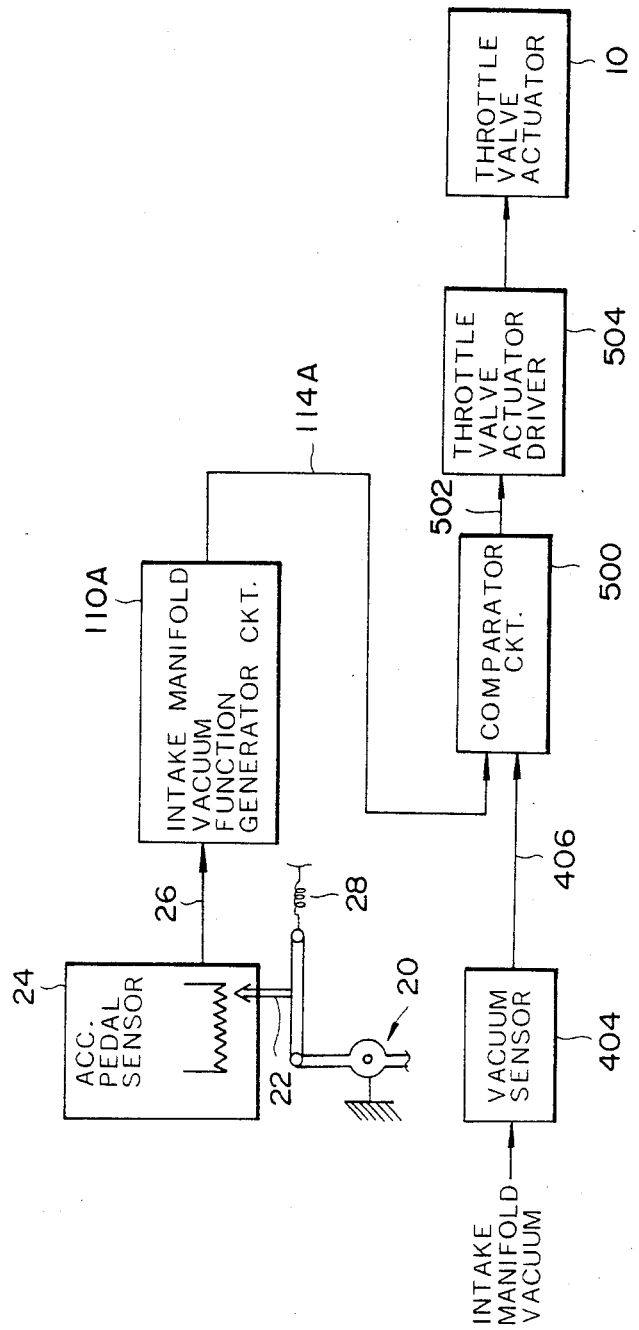
FIG. 2A is a block diagram showing a modified portion of the electronic control device shown in FIG. 2.

Referring to FIG. 2A, a function generator circuit 110A, which is similar to the function generator circuit 110, generates an electric signal 114A indicative of a target intake manifold vacuum as a predetermined function of a depression degree of an accelerator pedal 18 indicated by the accelerator pedal stroke electric signal 26. A vacuum sensor 404 detects intake manifold vacuum within an intake pipe 4 and generates an electric signal 406 indicative of the actual intake manifold vacuum. The electric signal 114A indicative of the actual intake manifold vacuum and the electric signal 114A indicative of the target intake manifold vacuum are compared with each other at a comparator circuit 500. The comparator circuit 500 generates an electric signal 502 indicative of the deviation between the both signals 114A and 406. A throttle valve actuator driver 504 supplies a command electric signal to a throttle valve actuator 10 to increase the opening degree of the throttle valve 8 when the actual intake manifold vacuum is larger than the target intake manifold vacuum and closes same when the actual intake manifold vacuum is smaller than the target intake manifold vacuum.

The use of the throttle valve opening degree or intake manifold vacuum as the target value is suitable for a gasoline internal combustion engine but not suitable for a diesel engine which is not provided with a throttle valve. The invention is however applicable to the diesel engine if a position of a control lever of a fuel injection pump is used as the target value.

Referring to FIG. 2B, a function generator circuit 110B generates an electric signal 114B indicative of a target control lever position as a predetermined function of an accelerator pedal stroke electric signal 26. A control lever actuator driver 510 generates a command electric signal 512 in response to the electric signal 114B indicative of the target control lever position and supplies it to a control lever actuator 514 which is mechanically connected to a control lever 516 of a fuel injection pump 518 which is known as a distributor-type fuel injection pump type VE.

Brief explanation follows of a fuel supply system with the fuel injection pump 518. Fuel within a fuel tank 520 is delivered by a presupply pump 522 to the inside of the pump housing of the fuel injection pump 518 via a fine filter 524. The delivered fuel is metered within the fuel injection pump in a known manner and then injected to the engine cylinders by nozzles 526.

Based on the practical values, the operation of the line pressure function generator circuit 156 and that of the line pressure regulator valve 96 are explained.

Figure 13:
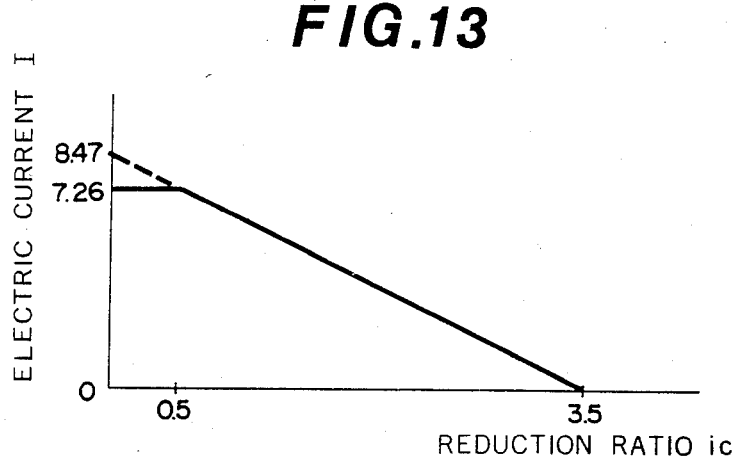
FIG. 13 is graph showing an electric current vs., reduction ratio characteristic generated by a line pressure function generator circuit.

As described before, the line pressure function generator circuit 156 effects conversion of the electric signal 154 from the reduction ratio arithmetic operation circuit 152 using a predetermined function to produce the result in the form of an electric signal 158, the form of the function being illustrated in FIG. 13. As illustrated, the current I varies from the value of 7.26 A to the value of 0 A linearly with variation in the reduction ratio ic from 0.5 to 3.5. This relation is expressed by $$I = 8.47 - 2.42 ic.$$

Assuming that the attracting force of the solenoid 198 of the line pressure regulator valve 96 is set to 1 Kg when the electric current I is 1 A, the attaracting force F (Kg) of the solenoid 198 is given by $$F = 8.47 - 2.42 ic$$

The balancing relationship of the line pressure regulator valve 96 shown in FIG. 7 can be expressed by the following equation.

$$P_L As = (F_{202} - F) + (F_{196} - A_V V_E) + F_{180}$$

$P_L$ ... line pressure
As ... the area of small diameter land of the spool 178
F ... attracting force of the solenoid 198
$F_{202}$ ... force of spring 202
$F_{196}$ ... force of spring 196
$F_{180}$ ... force of spring 180
Av ... the area of the diaphragm 190
$V_E$ ... intake manifold vacuum (Kg/cm²)
If practical values are set as
  As = 1.0 cm²
  $F_{202}$ = 7.26 Kg
  $F_{196}$ = 2.34 Kg
  $F_{180}$ = 0.73 Kg
  Av = 5.28 cm²
the above equation is expressed as $$P_L = 1.95 + 2.42 ic - 5.28 V_E$$

This relation, if illustrated, reveals curves as shown in FIG. 13. In the Figure, the reason why curves representing $P_L$ are horizontal when the magnitude of vacuum pressure varies beyond 350 mmHg is that the push rod 194 no longer contacts with the spool 178, allowing the spool out of influence of the vacuum. As will be understood from FIG. 13, the line pressure $P_L$ increases with an increase in reduction ratio, but decreases in inverse proportional to the magnitude of the engine manifold vacuum. The reason why the line pressure is constant when the magnitude of the vacuum increases beyond 350 mmHg is to assure sufficient oil pressure for engine braking.

Figure 14:
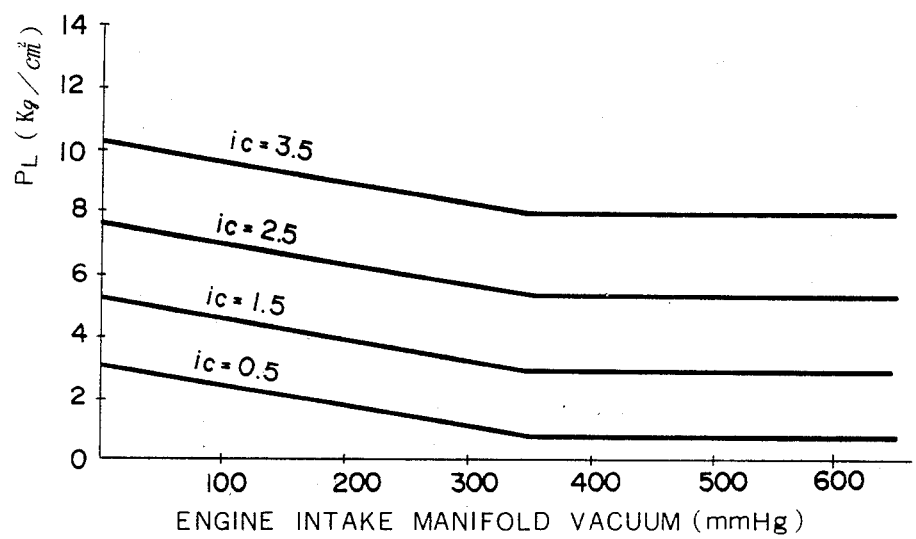
FIG. 14 is a graph showing a line pressure characteristic provided by a line pressure control device including the line pressure regulator valve shown in FIG. 7.

Next, in order to confirm that the oil pressure characteristic shown in FIG. 14, obtained by setting each value as mentioned above, is a desired one, a study is made as to what characteristic is ideal for the line pressure in the continuously variable transmission.

Figure 15:
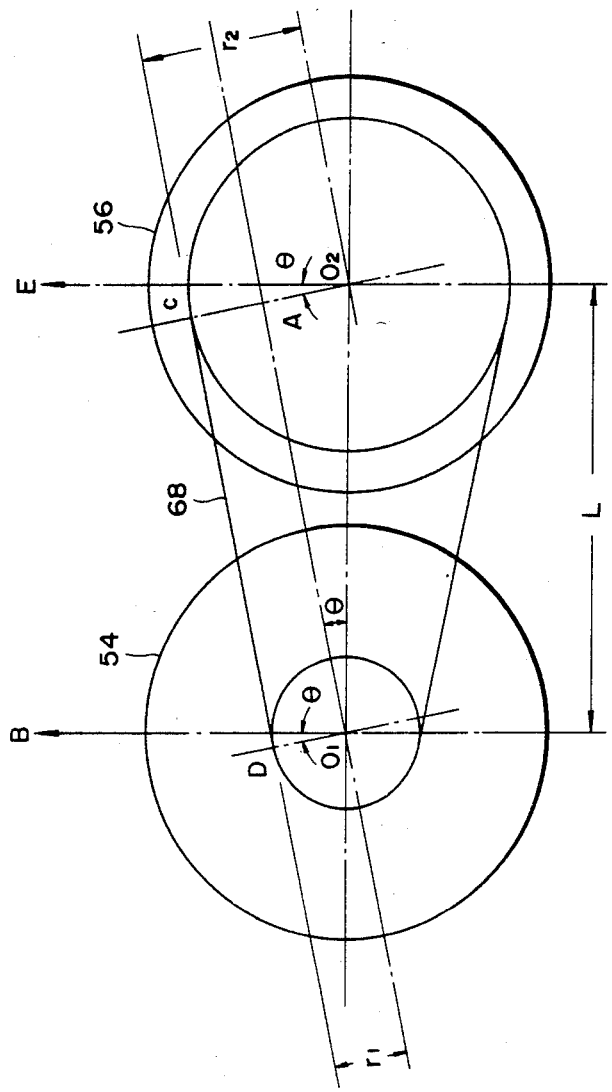
FIG. 15 is a schematic view showing a drive pulley, a driven pulley and a V-belt running around both pulleys.
Figure 16:
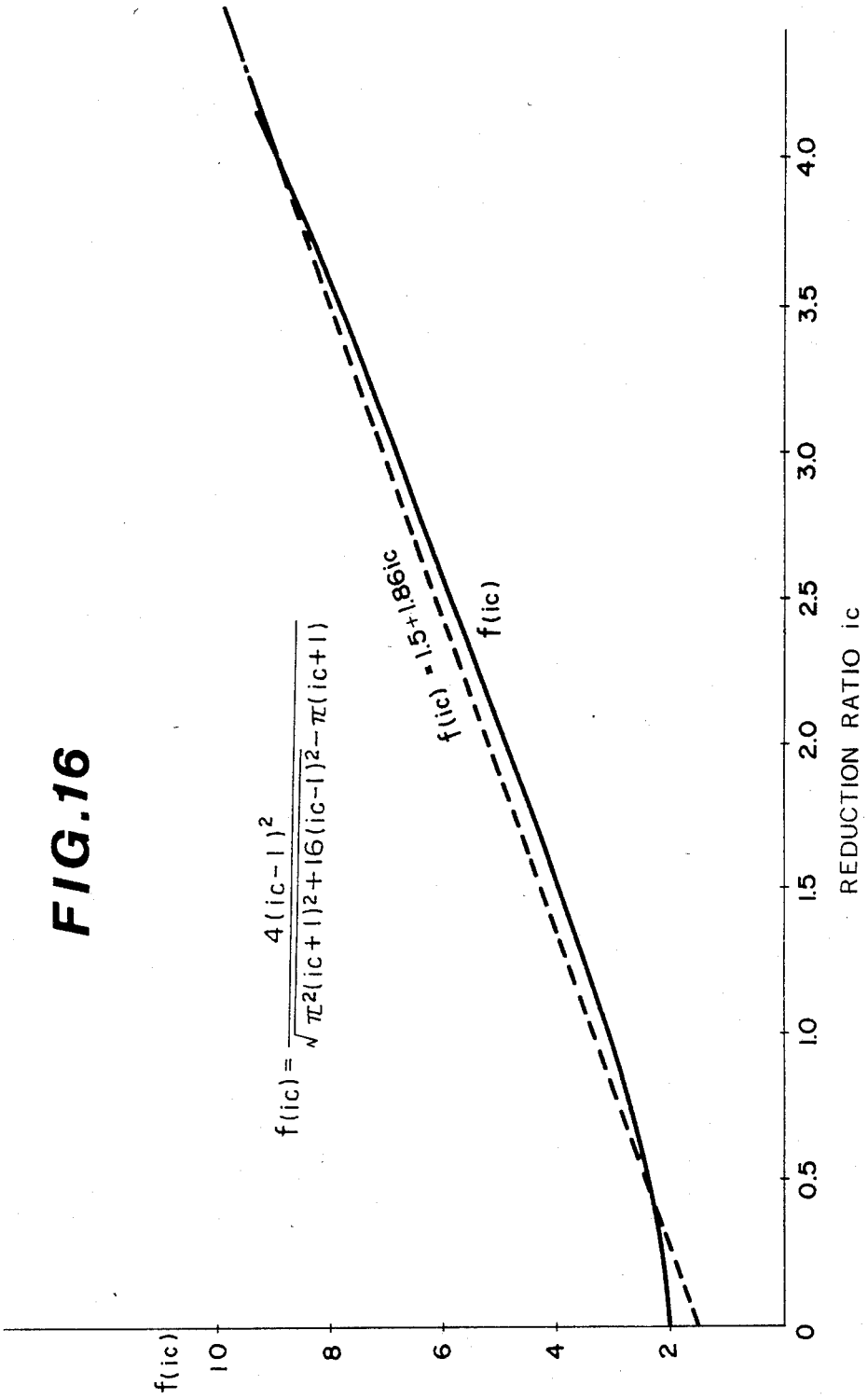
FIG. 16 is a graph showing the form of a function f(ic) which is used as a coefficient in a required oil pressure computing equation.

FIG. 15 shows in diagram a drive pulley 54, a driven pulley 56 and a V-belt 68. Expressing now that the radius of contacting diameter of the V-belt with the drive pulley is $r_1$, the radius of contacting diameter of the V-belt with the driven belt 56 is $r_2$, the distance between the shafts of the both pulleys is L, the length of the V-belt is l, $<BO_1D (= <EO_2C = <AO_1O_2)$ is $\theta$, and the reduction ratio is $i_c$, we have:

$$\sin \theta = (r_2 - r_1)/L \tag{2}$$

$$l = (\pi + 2\theta) r_2 + (\pi - 2\theta) r_1 + 2L \cos \theta \tag{3}$$

$$ic = r_2/r_1 \tag{4}$$

From equations (2) and (4), we have $$r_1 = \frac{L \cdot \sin\theta}{ic - 1} \tag{5}$$

$$r_2 = \frac{L \cdot ic \cdot \sin\theta}{ic - 1} \tag{6}$$

Substituting the equations (5) and (6) into the equation (3), we get $$ic = 1 + \frac{2\pi L \sin\theta}{l - 2L\cos\theta - L(\pi + 2\theta)\sin\theta} \tag{7}$$

If now l = 4L and $\theta$ is set to such a small amount as to let sin $\theta = \theta$ and cos $\theta = 1$, then equation (7) becomes $$ic = 1 + \frac{2\pi\theta}{2 - (\pi + 2\theta)\theta} \tag{7'}$$

we can get $$\theta = \frac{\sqrt{\pi^2(ic - 1)^2 + 16(ic - 1)^2} - \pi(ic + 1)}{4(ic - 1)} \tag{8}$$

Substituting $\theta$ as $\theta = \sin \theta$ into the equations (5) and (6), we get $$r_1 = \frac{\sqrt{\pi^2(ic - 1)^2 + 16(ic - 1)^2} - \pi(ic + 1)}{4(ic - 1)^2} \cdot L \tag{9}$$

$$r_2 = \frac{\sqrt{\pi^2(ic - 1)^2 + 16(ic - 1)^2} - \pi(ic + 1)}{4(ic - 1)^2} \cdot L \cdot ic \tag{10}$$

Next, if we let P1 represent oil pressure in the cylinder chamber 64 of the drive pulley 54, S1 the pressure acting area therein, P2 oil pressure in the cylinder chamber 74 of the driven pulley 56, S2 the pressure acting area therein, $\mu$ a correction coefficient between the V-belt and each of the both pulleys, T1 a torque of the shaft of the drive pulley, and T2 (= ic T1) a torque of the shaft of the driven pulley, a condition wherein there occurs no slip between the V-belt and pulleys is defined by $$\mu S1 P1 > T1/r1 \tag{11}$$

$$\mu S2 P2 > T2/r2 = (T1/r2) \cdot ic \tag{12}$$

Substituting the equations (9) and (10) into the equations (11) and (12), we get $$\mu S1\, P1 > \frac{4(ic - 1)^2}{\sqrt{\pi^2(\lambda c - 1)^2 + 16(ic - 1)^2} - \pi(ic + 1)} \cdot \frac{T1}{L} \tag{13}$$

$$\mu S2\, P2 > \frac{4(ic - 1)^2}{\sqrt{\pi^2(ic - 1)^2 + 16(ic - 1)^2} - \pi(ic + 1)} \cdot \frac{T1}{L} \tag{14}$$

If S1 = S2, P1 and P2 are defined by the same equation. The condition as to oil pressure wherein the V-belt does not slip holds for both pulleys. If we define $$f(ic) = \frac{4(ic-1)^2}{\sqrt{\pi^2(ic-1)^2 + 16(ic-1)^2} - \pi(ic+1)} \quad (15)$$

S1=S2 and $P_L$ represents P1 and P2, the equations (13) and (14) become $$\mu SP_L > f(ic)\cdot(T1/L) \quad (16)$$

If calculation is made of the function expressed by the equation (15) for different practical values of ic, the results are illustrated by solid lines in FIG. 15. This function f(ic) can be approximated by a straight dotted line for the range of reduction ratio ic from 0.5–3.5. This dotted line is defined by $$f(ic) = 1.5 + 1.86ic \quad (17)$$

If we use this approximation, the equation (16) becomes $$\mu SP_L > (1.5 + 1.86ic)\cdot(T1/L)$$

It can be expressed as $$L\mu SP_L > (1.5 + 1.86ic)\cdot T1 \quad (18)$$

Figure 17:
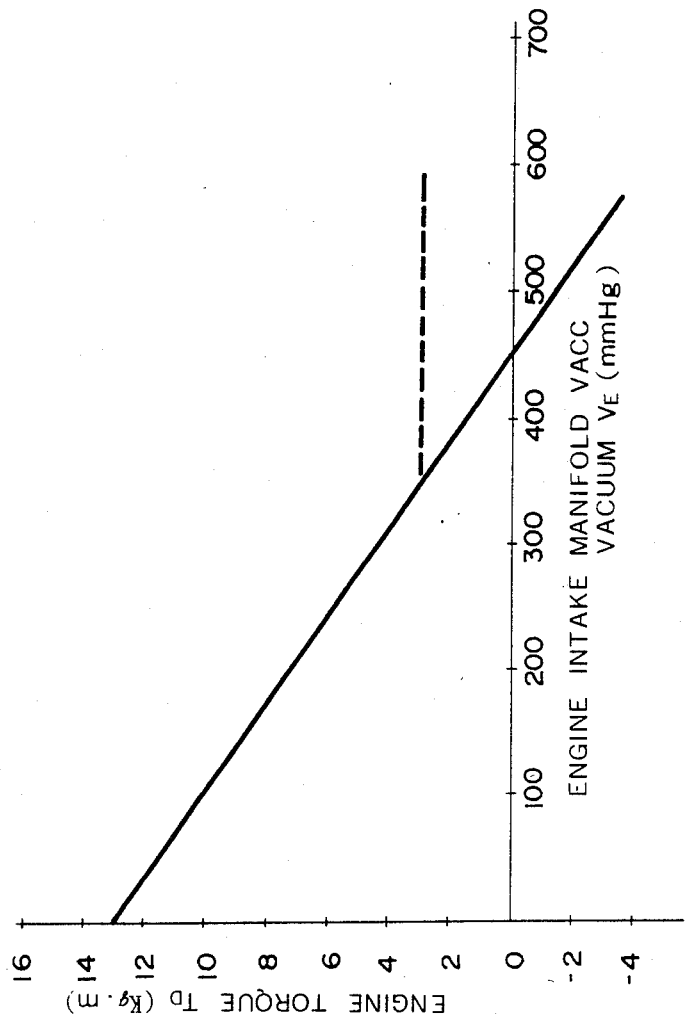
FIG. 17 is a graph showing the relationship between engine torque and intake manifold vacuum.

As mentioned before, $T_1$ is a torque of the shaft of the drive pulley and is equal to the output shaft torque of the engine 2. FIG. 17 illustrates how the engine torque varies versus engine intake manifold vacuum ($V_E$) and this relation can be defined by $$T_1 = 13 - 0.0286 V_E.$$

Accordingly, the equation (18) becomes $$L\mu SP_L > (1.5 + 1.86ic)\cdot(13 - 0.0286 V_E).$$

With this equation, when $V_E \geq 450$, $T1 \leq 0$ and the oil pressure $P_L$ will take a nagative value, but, it is necessary to prevent the V-belt from slipping even under engine braking state when $T1 \leq 0$. Accordingly, when the vacuum is not smaller than 350, an oil pressure corresponding to engine torque 3 kg.m shall be set. Thus, if $$V_E \leq 350 \text{ mmHg},$$
$$L\mu SP_L > (1.5 + 1.86ic)\cdot(13 - 0.0286 V_E) \quad (19)$$

and if $V_E > 350$ mmHg, $$L\mu SP_L > (1.5 + 1.86ic)\cdot 3 \quad (20)$$

If the setting is made as
$\mu = 0.1$
$S = 200$ cm²
$L = 0.5$ m,
$\mu SL = 10$, and the equations (19) and (20) become $$P_L > (1/10)(1.5 + 1.86ic)(13 - 0.0286 V_E) \quad (21)$$

$$P_L > (3/10)(1.5 + 1.86ic) \quad (22)$$

If the line pressure $P_L$ is set to satisfy equations resulting from replacing greater than signs with equal signs, we can get the most efficient pressure characteristic (practically, it is necessary to set the level of the line pressure at a value larger than necessary by resonable amount). This characteristic is shown in FIG. 18.

Figure 18:
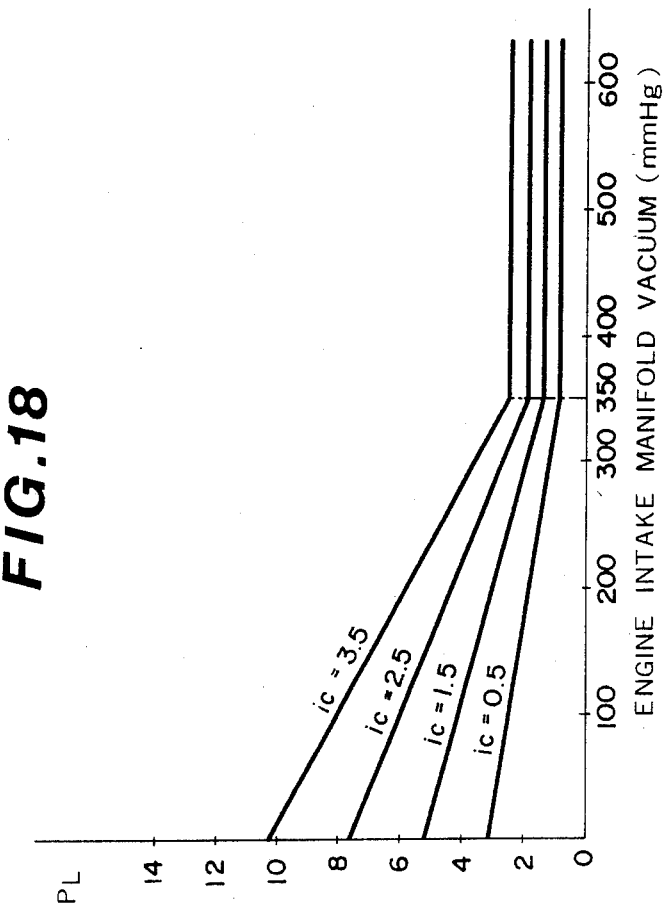
FIG. 18 is a graph showing a desired line pressure characteristic.

Comparison of the characteristic shown in FIG. 18 with the before mentioned characteristic shown in FIG. 14 reveals that the line pressure obtained according to the present invention substantially follows the variation in the ideal oil pressure characteristic.

Figure 19:
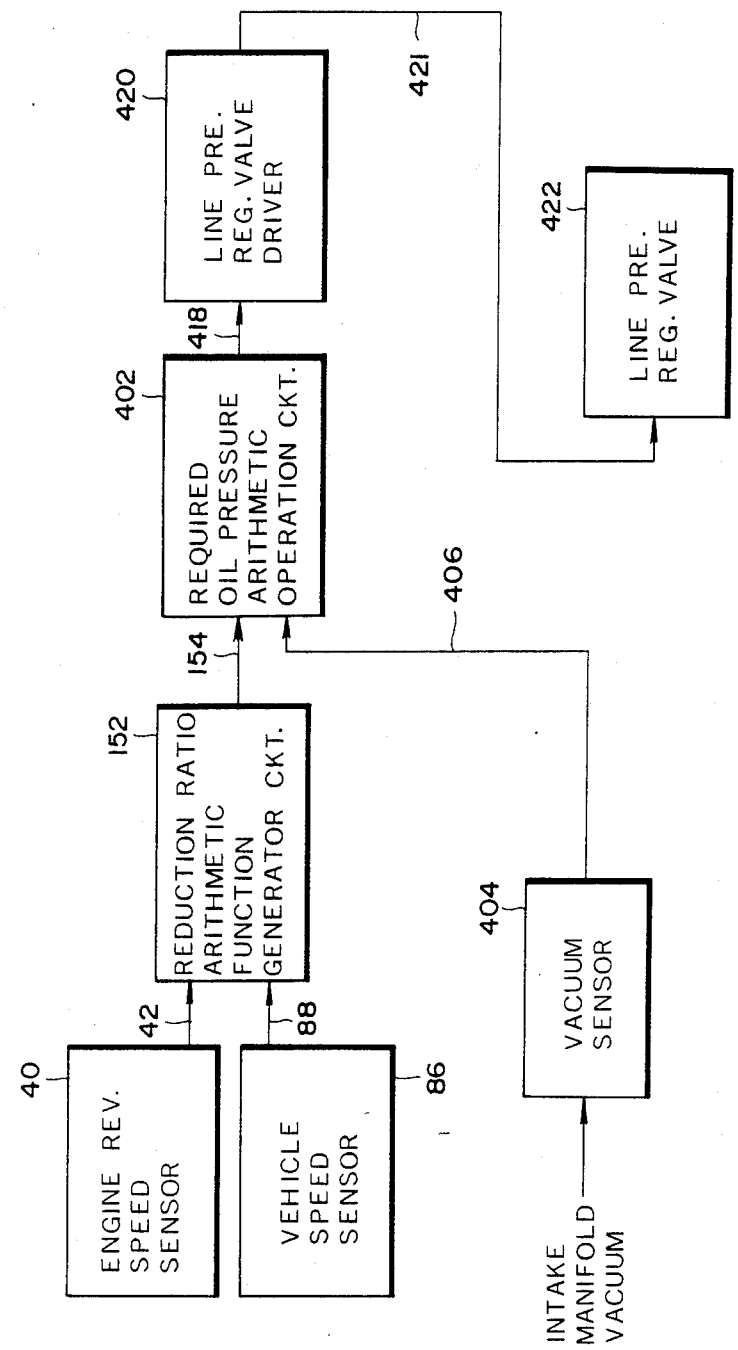
FIG. 19 is a second form of a line pressure control device.
Figure 20:
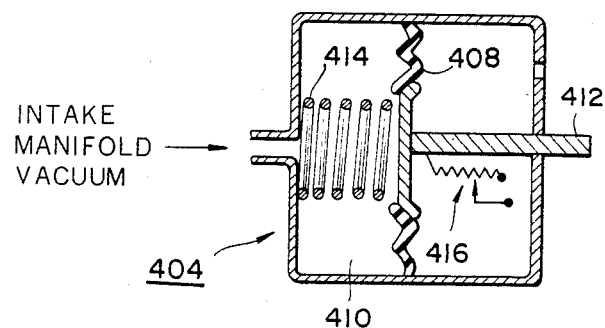
FIG. 20 is a longitudinal sectional view of a vacuum sensor used in the electronic control device shown in FIG. 2A and in the line pressure control device shown in FIG. 19.
Figure 21:
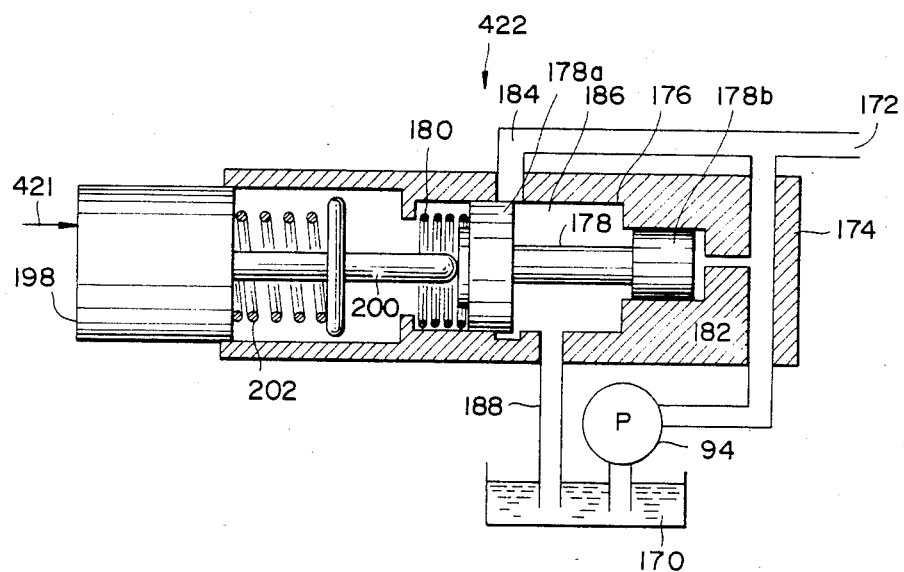
FIG. 21 is a longitudinal sectional view of a second form of a line pressure regulator valve used in the line pressure control device shown in FIG. 19.

Next, an explanation is made regarding the second form of a line pressure control device in connection with FIGS. 19 to 21.

As mentioned above, the line pressure characteristic provided by the above mentioned line pressure regulator valve 96 resembles subatantially the ideal line pressure characteristic, but, strictly speaking the line pressure becomes higher than the ideal line pressure when the vacuum falls in a high vacuum range (see FIGS. 18 and 14). With the second form which is described hereinafter in connection with FIG. 19, the line pressure characteristic is obtained which agrees strictly with the ideal line pressure characteristic. Arithmetic operation circuit 402 that computes the required oil pressure is supplied with an electric signal 154 from the reduction ratio arithmatic operation circuit 152 indicative of a reduction ratio and also an electric signal 406 from a vacuum sensor 404 indicative of a vacuum pressure. This reduction ratio arithmatic operation circuit 152 is the same as the reduction ratio arithmatic operation circuit 152 shown in FIG. 2. As shown in FIG. 20, the vacuum sensor 404 includes a vacuum chamber 410 defined by a diaphragm 408, the vacuum chamber being connected with an engine intake pipe 4, a rod 412 attached to the diaphragm 408 being pressed rightwardly by a spring 414. Attached to the rod 412 is a potentiometer 416. It follows that the rod 412 moves in proportional to the intake manifold vacuum, thus causing the potentiometer 416 to produce an electric signal 406 proportional to the intake manifold vacuum. In the required oil pressure arithmatic operation circuit. 402, arithmatic operations as shown in the equations (21) and (22) are performed based upon the input electric signals 154 and 406. This arithmatic operation circuit can be easily constructed by a multiplication circuit using OP amplifiers or a microcomputer and thus the detailed explanation thereof is omitted. An electric signal 418 indicating the oil pressure command value provided by the required oil pressure arithmatic operation circuit 402 is supplied to the line pressure regulator valve driver 420, and the line pressure regulator valve driver 420 supplied an electric current (electric signal 421) to the solenoid of the line pressure regulator valve 422 in accordance with the electric signal 418. As shown in FIG. 21, the line pressure regulator valve 422 has a construction resulting from removing the diaphragm 190 from the line pressure regulator valve 96 shown in FIG. 7 (the same reference numerals as used in FIG. 7, thus omitting the detailed description). Apparently, with the line pressure regulator valve 422, the line pressure varying in proportional to the electric current passing through the solenoid 198 is provided. Accordingly, the ideal line pressure characteristic as shown in FIG. 18 is obtained.

Next, the third form of a line pressure control device is explained in connection with FIG. 22.

Figure 6:
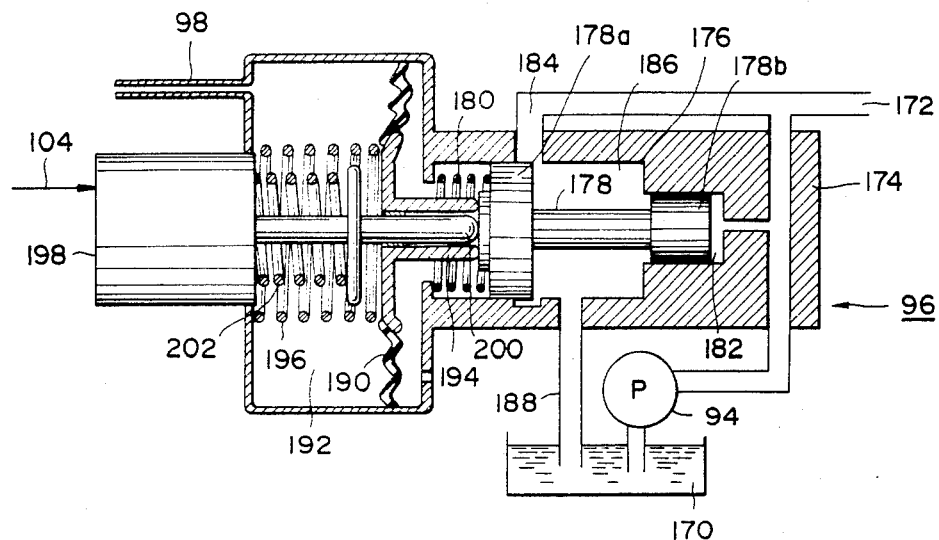
FIG. 6 is a cross sectional view showing a first form of a line pressure regulator valve used in the control apparatus shown in FIG. 1.

The dimensional relationship between a valve bore 452 of a line pressure regulator valve 451 formed in a valve body 450 and a spool 454 is similar to that between counterparts in FIG. 6 such that there occurs in a passage 172 an oil pressure varying in proportional to a force F2 applied upwardly, viewing in the Figure, to the spool 454. The lower end of the spool 454 is linked with one end of a lever 456 which has an other end thereof being attached to a rod 460 attached to the diaphragm 458 and being pressed by a spring 462. It follows that applied to the other end of the lever 456 is a force F1 obtained by adding a force by a spring 456 to a constant force by the spring 462. The vacuum chamber 464 above the diaphragm 458 communicates with the engine intake manifold and is dimensioned such that a force applied to the diaphragm 458 when the vacuum is 350 mmHg is equal to a force of the spring 468. Therefore, there is applied no force on the rod 460 when the vacuum is not smaller than 350 mmHg and there is applied to the latter a force inversely proportional to the vacuum when the vacuum is smaller than 350 mmHg. Therefore, the force F1 reveals the relation as shown in FIG. 22. Provided on the middle portion of the lever 456 is a movable fulcrum which is constructed of a roller 472 attached to one end of a rod 470 that is movable to right and left viewing in the Figure. The rod 470 at an other end thereof is pressed against the conical disc 66 of the driving pulley 54 by means of a spring 474. The distance $l_1$ between the roller 472 of the movable fulcrum and the rod 460 and that $l_2$ between the roller 472 of the movable fulcrum and that end linked with the spool 454 has a relationship such that, if the reduction ratio is 0.5, $l_1/l_2 = 1$ and if the reduction ratio is 3.5, $l_1/l_2 = 3.2$.

There is a relation between F1 and F2 as follows:

$$F_2 = l_1/l_2 F_1$$

Figure 22:
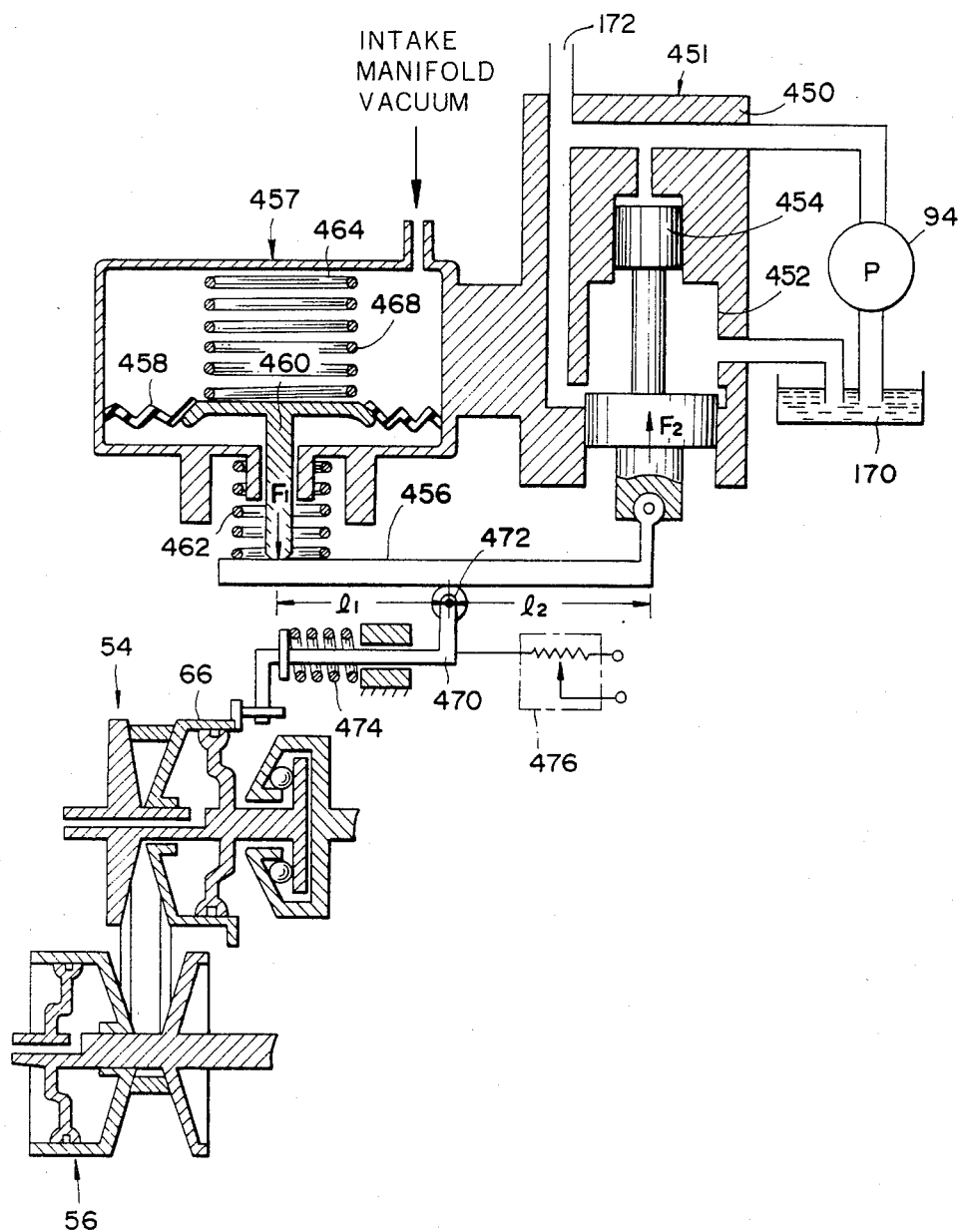
FIG. 22 is a diagrammatic sectional view showing a third form of a line pressure control device.

Since F1 shows a characteristic as shown in FIG. 22 as previously described, F2 shows a characteristic as shown in FIG. 23 for different values of $l_1/l_2$. Since the line pressure in the passage 172 varies in proportional to F2, the line pressure shows the characteristic as shown in FIG. 24. This line pressure characteristic agrees with the ideal line pressure characteristic as shown in FIG. 17 previously described. In this manner, in this embodiment the desired line pressure is obtained without use of an electronic circuit. If a potentiometer 476 is mounted on the rod 470 as shown in FIG. 22, an output signal therefrom indicates a reduction ratio, thus providing the reduction ration in terms of an electric signal. It makes no difference even if the rod 470 is render to coact with the movable conical disc 76 of the driven pulley 56.

As having been described above, the line pressure that is a shift control operating pressure to be supplied to the shift control valve is adjusted to vary in proportional to the reduction ratio between the drive and driven pulleys and in inreverse proportional to the intake manifold vacuum, so that the line pressure is adjusted to provide a succifiently high V-belt transmission torque capacity in accordance with the engine output torque and reduction ratio, thus allowing the V-belt to always subject to an appropriate force, enhancing its life and the power transmission effeciency. Besides, it is not necessary for the oil pump to discharge oil at an excessively high pressure, thus reducing loss on the part of the oil pump, with the result that an endurable and high effecient continuously variable transmission is provided.

In the case of the line pressure control using the line pressure regulator valve 96 shown in FIG. 1, strictly speaking the line pressure obtained does not agree with the ideal line pressure characteristic, but, there is an advantage that an electronic control device is simple, contributing to a reduction in supply cost.

In the case of the line pressure control using the line pressure regulator vehicle shown in FIG. 21, the most efficient line pressure characteristic is provided, thus enhancing the effeiciency of a continuously variable transmission.

In the case line pressure control is shown in FIG. 22 of the third embodiment, the line pressure characteristic is provided without any use of an electronic control circuit, thus making contribution to reduction in cost.

What is claimed is:

1. A control apparatus for a motor vehicle having an accelerator pedal, an engine having an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the driven shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:

an accelerator pedal sensor means coupled with the accelerator pedal for generating an accelerator pedal stroke electric signal indicative of a depression degree of the accelerator pedal;

an engine revolution speed sensor means coupled with the engine for generating an actual engine revolution speed electric signal indicative of an actual revolution speed of the engine;

means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal, said first predetermined function providing a single target engine revolution value for any single depression degree of the accelerator pedal;

a fuel supply device control means coupled with said accelerator pedal sensor means for generating a target engine torque electric signal indicative of a target engine torque which is a second predetermined function of said accelerator pedal stroke electric signal, said second predetermined function providing a single target engine torque value for any single depression of the accelerator pedal;

a comparator means coupled with said engine revolution speed sensor means and said output electric signal generating means for generating a deviation signal indicative of a difference between said actual engine revolution speed electric signal and said output electric signal;

a pumping means for supplying hydraulic fluid;

means for detecting an actual reduction ratio within said continuously variable transmission;

means coupled with said pumping means for regulating the fluid supplied by said pumping means in response to the detected actual reduction ratio within the continuously variable transmission and generating a line pressure variable with the detected actual reduction ratio;

a shift control valve driver means coupled with said comparator means for generating an electric command signal in response to said deviation signal;

a shift control valve means coupled with said line pressure generating means to receive said line pressure for controlling fluid supply to said both cylinder chambers and fluid discharge therefrom in response to said electric command signal;

a fuel supply device communicating with the intake pipe and including a control element means for adjusting supply of fuel to the engine; and means coupled with said fuel supply device control means for actuating said control element means in response to said target engine torque electric signal.

2. A control apparatus as claimed in claim 1 wherein said actuating means comprises:

a fuel supply device actuator driver means coupled with said fuel supply device control function generator means for generating a second electric command signal in response to said target engine torque electric signal; and a fuel supply device actuator means coupled with said fuel supply device actuator driver means and coupled with said control element means for actuating said control element means in response to said second electric command signal.

3. A control apparatus as claimed in claim 1, wherein said fuel supply device is a carburetor and said control element means is a throttle valve of said carburetor mounted within the intake pipe.

4. A control apparatus as claimed in claim 3, wherein said target engine torque is represented by an opening degree of the throttle valve.

5. A control apparatus as claimed in claim 3, wherein said target engine torque is represented by an intake manifold vacuum.

6. A control apparatus as claimed in claim 1, wherein said fuel supply device is a fuel injection pump and said control element means is a control lever of said fuel injection pump.

7. A control apparatus as claimed in claim 6, wherein said target engine torque is represented by a position of said control lever of said fuel injection pump.

8. A control apparatus as claimed in claim 1, wherein a desired horsepower of the engine increases as the depression degree of the accelerator pedal indicated by said accelerator pedal stroke electric signal increases, and wherein said first and second predetermined functions define a pair of a desired value of said target engine torque electric signal and a desired value of said first target engine revolution speed electric signal for said desired horsepower output, said pair providing an operating condition wherein the engine operates at the least fuel consumption rate for production of said desired horsepower output.

9. A control apparatus as claimed in claim 1, wherein a desired horsepower output of the engine increases as the depression degree of the accelerator pedal indicated by said accelerator pedal stroke electric signal increases, and wherein said first and second predetermined function define a pair of a desired value of said target engine torque electric signal and a desired value of said first target engine revolution speed electric signal for said desired horsepower output, said pair providing an operating condition wherein the engine operates at the least fuel consumption rate for production of said desired horsepower output as long as said value of said first target engine revolution speed is higher than a predetermined engine revolution speed, and wherein said first predetermined function defines said predetermined engine revolution speed when an operating condition wherein the engine operates at the least fuel consumption rate for production of said desired horsepower output demands an engine revolution speed lower than said predetermined engine revolution speed.

10. A control apparatus as claimed in claim 1, wherein said electric command signal is in the form of an electric current increasing and decreasing from a reference electric current, and wherein said shift control valve means is in the form of an electric current to hydraulic fluid pressure converter and controls fluid supply to and fluid discharge from the cylinder chamber of the drive pulley and the cylinder chamber of the driven pulley such that when said first electric command signal is equal to said reference electric current, fluid pressure within the cylinder chamber of the drive pulley is equal to that within the cylinder chamber of the driven pulley, when said first electric command signal is increased from said reference electric current, fluid pressure within the cylinder chamber of one of the drive and driven pulleys is decreased, and when said first electric command signal is decreased from said reference electric current, fluid pressure within the cylinder chamber of the other one of said drive and driven pulleys is decreased.

11. A control apparatus (as claimed in claim 12,) for a motor vehicle having an accelerator pedal, an engine having an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the driven shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:

an accelerator pedal sensor means coupled with the accelerator pedal for generating an accelerator pedal stroke electric signal indicative of a depression degree of the accelerator pedal;

an engine revolution speed sensor means coupled with the engine for generating an actual engine revolution speed electric signal indicative of an actual revolution speed of the engine;

means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal;

a fuel supply device control means coupled with said accelerator pedal sensor means for generating a target engine torque electric signal indicative of a target engine torque which is a second predetermined function of said accelerator pedal stroke electric signal;

a comparator means coupled with said engine revolution speed sensor means and said output electric signal generating means for generating a deviation signal indicative of a difference between said actual engine revolution speed electric signal and said output electric signal;

a shift control means coupled with said comparator means for varying a reduction ratio in the continuously variable transmission to vary the revolution speed of the engine in a direction to reduce said deviation signal;

a fuel supply device communicating with the intake pipe and including a control element means for adjusting supply of fuel to the engine; and means coupled with said fuel supply device control function generator means for actuating said control element means in response to said target engine torque electric signal;

wherein said shift control means comprises:

a line pressure regulator valve means for providing a line pressure;

a shift control valve driver means coupled with said comparator circuit means for generating an electric command signal in response to said deviation signal; and a shift control valve means communicating with said line pressure regulator valve means and coupled with said shift control valve driver means for controlling fluid supply to and fluid discharge from the cylinder chamber of the drive pulley and the cylinder chamber of the driven pulley such that when said first electric command signal is equal to said reference electric current, fluid pressure within the cylinder chamber of the drive pulley is made equal to that within the cylinder chamber of the driven pulley, when said first electric command signal is increased from said reference electric current, fluid pressure within the cylinder chamber of one of the drive and driven pulleys is decreased, and when said first electric command signal is decreased from said reference electric current, fluid pressure within the cylinder chamber of the other one of said drive and driven pulleys is decreased;

said electric command signal being in the form of an electric current increasing and decreasing from a reference electric current, wherein said shift control valve means comprises:

a valve body formed with a first valve bore, a second valve bore and a third valve bore, said first valve bore having a first port, a second port, a third port, a fourth port and a fifth port which are arranged such that said second port and fourth port are disposed between said first port and fifth port and said third port is disposed between said second port and fourth port;

said first port and fifth port communicating with said line pressure regulator valve means to receive the line pressure therefrom, said third port serving as a drain port;

a first spool slidably disposed in said first valve bore, the first spool having a first land, a second land and a third land and defining a first chamber between said first and second lands and a second chamber between said second and third lands;

said first spool having a position wherein said second land agrees with and covers said third port, said first land uncovers said first port to form a clearance communicating with said first chamber and said third land uncovers said fifth port to form a clearance communicating with said second chamber;

said first chamber communicating with the cylinder chamber of the drive pulley via said second port, said second chamber communicating with the cylinder chamber of the driven pulley via said fourth port;

a second spool slidably disposed in said second valve bore and defining on a side near said first valve bore a third chamber communicating with said line pressure regulator valve means and on a side remote from said first valve bore a fourth chamber communicating with the cylinder chamber of the driven pulley;

said second spool having a rod thereon extending through a partition wall between said first valve bore and second valve bore and contacting with the adjacent one of ends of said first spool;

a spring disposed in said fourth chamber biasing said second spool toward said first spool;

a third spool slidably disposed in said third valve bore and defining on a side near said first valve bore a chamber communicating with said line pressure regulator valve means and on a side remote from said first valve bore a chamber communicating with the cylinder chamber of the drive pulley;

said third spool having a rod thereon extending through a partition wall between said first valve bore and third valve bore and contacting with the other of said ends of said first spool;

a solenoid having a push rod contacting with said third spool to bias same toward said first spool with a force responsive to electric current passing through said solenoid;

the force of said spring being so selected as to be equal in magnitude to the force of said push rod of said solenoid when said reference electric current is supplied to said solenoid.

12. A control apparatus as claimed in claim 11, wherein said first electric command signal results from adding to said reference electric current an electric current varying in direct proportional to said deviation signal generated by said comparator means.

13. A control apparatus as claimed in claim 11, wherein said first electric command signal results from adding to said reference electric current an electric current varying in direct proportional to said deviation signal generated by said comparator circuit and an electric current varying in direct proportional to the integration of said deviation signal.

14. A control apparatus as claimed any one of the preceding claim 13, wherein said third predetermined function defines a predetermined lower limit target engine revolution speed electric signal indicative of a constant lower limit engine revolution speed when said vehicle speed electric signal is smaller than a first predetermined value, a predetermined target lower limit engine revolution speed electric signal indicative of a constant upper limit engine revolution speed when said vehicle speed electric signal is larger than a second predetermined value which is larger than said first predetermined value, and an inclined target engine revolution speed electric signal indicative of an engine revolution speed varying from said constant lower limit engine revolution speed to said constant upper limit engine revolution speed when said vehicle speed electric signal is between said first and second predetermined values.

15. A control apparatus for a motor vehicle having an accelerator pedal, an engine having an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the drive shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:

- an accelerator pedal sensor means coupled with the accelerator pedal for generating an accelerator pedal stroke electric signal indicative of a depression degree of the accelerator pedal;
- an engine revolution speed sensor means coupled with the engine for generating an actual engine revolution speed electric signal indicative of an actual revolution speed of the engine;
- means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal, said first predetermined function providing a single target engine revolution value for any single depression degree of the accelerator pedal;
- a fuel supply device control means coupled with said accelerator pedal sensor means for generating a target engine torque electric signal indicative of a target engine torque which is a second predetermined function of said accelerator pedal stroke electric signal, said second predetermined function providing a single target engine torque value for any single depression of the accelerator pedal;
- a comparator means coupled with said engine revolution speed sensor means and said output electric signal generating means for generating a deviation signal indicative of a difference between said actual engine revolution speed electric signal and said output electric signal;
- a vehicle speed sensor means coupled with the continuously variable transmission for generating a vehicle speed electric signal indicative of a vehicle speed;
- a selected shift position sensor means for generating a shift position signal indicative of a selected shift position by a shift lever;
- wherein said output electric signal generating means includes a limit engine revolution speed generator means coupled with said vehicle speed sensor means for generating a second target engine revolution speed electric signal which is a third predetermined function of said vehicle speed electric signal, and a switching means coupled with said engine revolution speed generator means, said limit engine revolution speed generator means and said selected shift position sensor means for allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position;
- a shift control valve driver means coupled with said comparator means for generating a command electric signal in response to said deviation signal;
- pumping means for supplying hydraulic fluid;
- means for regulating the fluid supplied by said pumping means to provide a line pressure which varies in direct proportional to the reduction ratio between the drive and driven pulleys and in inverse proportional to an intake manifold vacuum; and
- a shift control valve means connected to said line pressure regulator valve means to receive said line pressure and coupled with said shift control valve driver means for controlling fluid supply to both of the cylinder chambers and fluid discharge therefrom in response to said command electric signal.

16. A control apparatus as claimed in claim 15, wherein said means for regulating the fluid comprising:

- a reduction ratio arithmetic operation circuit means coupled with said engine revolution speed sensor means and said vehicle speed sensor means for generating a reduction ratio electric signal indicative of a reduction ratio between said drive and driven pulleys;
- a required line pressure function generator means coupled with said reduction ratio arithmetic operation circuit for generating a required line pressure electric signal which is a predetermined function of said reduction ratio electric signal;
- a line pressure regulator valve driver means coupled with said required line pressure function generator means for generating a line pressure command electric signal in response to said required line pressure electric signal; and
- a line pressure regulator valve means coupled with said line pressure regulator valve driver means and communicating with the intake pipe for regulating the fluid supplied by said pumping means to provide said line pressure in response to said line pressure command electric signal and the intake manifold vacuum within the intake pipe.

17. A control apparatus for a motor vehicle having an accelerator pedal, an engine havng an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the driven shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:

- an accelerator pedal sensor means coupled with the accelerator pedal for generating an accelerator pedal stroke electric signal indicative of a depression degree of the accelerator pedal;

an engine revolution speed sensor means coupled with the engine for generating an actual engine revolution speed electric signal indicative of an actual revolution speed of the engine;

means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal;

a fuel supply device control means coupled with said accelerator pedal sensor means for generating a target engine torque electric signal indicative of a target engine torque which is a second predetermined function of said accelerator pedal stroke electric signal;

a comparator means coupled with said engine revolution speed sensor means and said output electric signal generating means for generating a deviation signal indicative of a difference between said actual engine revolution speed electric signal and said output electric signal;

a shift control means coupled with said comparator means for varying a reduction ratio in the continuously variable transmission to vary the revolution speed of the engine in a direction to reduce said deviation signal;

a fuel supply device communicating with the intake pipe and including a control element means for adjusting supply of fuel to the engine;

means coupled with said fuel supply device control means for actuating said control element means in response to said target engine torque electric signal;

a vehicle speed sensor means coupled with the countinuously variable transmission for generating a vehicle speed electric signal indicative of a vehicle speed;

a selected shift position sensor means for generating a shift position signal indicative of a selected shift position by a shift lever;

wherein said output electric signal generating means includes a limit engine revolution speed generator means coupled with said vehicle speed sensor means for generating a second target engine revolution speed electric signal which is a third predetermined function of said vehicle speed electric signal, and a switching means coupled with said engine revolution speed generator means, said limit engine revolution speed generator means and said selected shift position sensor means for allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position;

wherein said shift control means comprises:

a shift control valve driver means coupled with said comparator means for generating a first command electric signal in response to said deviation signal;

pumping means for the hydraulic fluid;

means for regulating the fluid supplied by said pumping means to provide a line pressure which varies in direct proportional to the reduction ratio between the drive and driven pulleys and in inverse proportional to an intake manifold vacuum;

a shift control valve means connected to said line pressure regulator valve means to receive said line pressure and coupled with said shift control valve driver means for controlling fluid supply to both of the cylinder chambers and fluid discharge therefrom in response to said first command electric signal;

wherein said means for regulating the fluid comprises:

a reduction ratio arithmetic operation circuit means coupled with said engine revolution speed sensor means and said vehicle speed sensor means for generating a reduction ratio electric signal indicative of a reduction ratio between said drive and driven pulleys;

a required line pressure generator means coupled with said reduction ratio arithmetic operation circuit for generating a required line pressure electric signal which is a predetermined function of said reduction ratio electric signal;

a line pressure regulator valve driver means coupled with said required line pressure function generator means for generating a line pressure command electric signal in response to said required line pressure electric signal; and a line pressure regulator valve means coupled with said line pressure regulator valve driver means and communicating with the intake pipe for regulating the fluid supplied by said pumping means to provide said line pressure in response to said line pressure command electric signal and the intake manifold vacuum within the intake pipe;

wherein said line pressure regulator valve means comprises:

a valve body having a valve bore;

a spool disposed within said valve bore, said spool having a large diameter portion and a small diameter portion;

means defining a passage communicating with said pumping means to receive fluid therefrom;

said small diameter portion defining within said valve bore a first chamber communicating with said passage, said small diameter portion and said large diameter portion defining therebetween a second chamber which is drained;

said valve body having a port communicating with said second chamber and said passage;

said small diameter portion being exposed to fluid pressure within said first chamber to bias said spool in a first direction away from said first chamber;

means responsive to said line pressure command signal and intake manifold vacuum for pushing said spool in a second direction opposite to said first direction with a force variable in direct proportional to the reduction ratio and in inverse proportional to the intake manifold vacuum; and said large diameter portion covering said port to decrease an opening area to said second chamber when said spool moves in said second direction and uncovering said port to increase the opening area to said second chamber when said spool moves in said first direction.

18. A control apparatus as claimed in claim 17, wherein said pushing means comprises:
- a spring means for biasing said spool in said second direction;
- a diaphragm device having a housing and a diaphragm within said housing to define a vacuum chamber communicating with the intake pipe to receive the intake manifold vacuum, and a hollow push rod attached to said diaphragm and contacting with said spool, and a diaphragm spring disposed within said vacuum chamber biasing said hollow push rod against said spool;
- a solenoid device having a push rod extending through said hollow push rod and contacting with said spool, a solenoid spring disposed within said vacuum chamber biasing said solenoid push rod against said spool and a solenoid for pulling said solenoid push rod against said solenoid spring with a force variable in direct proportional to electric current passing through said solenoid;
- said line pressure command electric signal being in the form of an electric current which passes through said solenoid and which decreases as the reduction ratio increases.

19. A control apparatus as claimed in claim 15, wherein said means for regulating the fluid comprising:
- a vacuum sensor means for generating an intake manifold vacuum electric signal indicative of an intake manifold vacuum within the intake pipe;
- a reduction ratio arithmetic operation circuit means coupled with said engine revolution speed sensor means and said vehicle speed sensor means for generating a reduction ratio electric signal indicative of a reduction ratio between said drive and driven pulleys;
- a required line pressure function generator means coupled with said reduction ratio arithmetic operation circuit and said vacuum sensor means, for generating a required line pressure electric signal which is a predetermined function of said reduction ratio electric signal and intake manifold vacuum electric signal;
- a line pressure regulator valve driver means coupled with said required line pressure function generator means for generating a line pressure command electric signal in response to said required line pressure signal; and
- a line pressure regulator valve means coupled with said line pressure regulator valve driver means for regulating the fluid supplied by said pumping means to provide said line pressure in response to said line pressure command electric signal.

20. A control apparatus (as claimed in claim 18,) for a motor vehicle having an accelerator pedal, an engine having an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the driven shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:
- an accelerator pedal sensor means coupled with the accelerator pedal for generating an accelerator pedal stroke electric signal indicative of a depression degree of the accelerator pedal;
- an engine revolution speed sensor means coupled with the engine for generating an actual engine revolution speed electric signal indicative of an actual revolution speed of the engine;
- means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal;
- a fuel supply device control means coupled with said accelerator pedal sensor means for generating a target engine torque electric signal indicative of a target engine torque which is a second predetermined function of said accelerator pedal stroke electric signal;
- a comparator means coupled with said engine revolution speed sensor means and said output electric signal generating means for generating a deviation signal indicative of a difference between said actual engine revolution speed electric signal and said output electric signal;
- a shift control means coupled with said comparator means for varying a reduction ratio in the continuously variable transmission to vary the revolution speed of the engine in a direction to reduce said deviation signal;
- a fuel supply device communicating with the intake pipe and including a control element means for adjusting supply of fuel to the engine;
- means coupled with said fuel supply device control means for actuating said control element means in response to said target engine torque electric signal;
- a vehicle speed sensor means coupled with the continuously variable transmission for generating a vehicle speed electric signal indicative of a vehicle speed;
- a selected shift position sensor means for generating a shift position signal indicative of a selected shift position by a shift lever;
- wherein said output electric signal generating means includes a limit engine revolution speed generator means coupled with said vehicle speed sensor means for generating a second target engine revolution speed electric signal which is a third predetermined function of said vehicle speed electric signal, and a switching means coupled with said engine revolution speed generator means, said limit engine revolution speed function generator means and said selected shift position sensor means for allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position;
- wherein said shift control means comprises:

a shift control valve driver means coupled with said comparator means for generating a command electric signal in response to said deviation signal;

pumping means for the hydraulic fluid;

means for regulating the fluid supplied by said pumping means to provide a line pressure which varies in direct proportional to the reduction ratio between the drive and driven pulleys and in inverse proportional to an intake manifold vacuum;

a shift control valve means connected to said line pressure regulator valve means to receive said line pressure and coupled with said shift control valve driver means for controlling fluid supply to both of the cylinder chambers and fluid discharge therefrom in response to said command electric signal;

wherein said means for regulating the fluid comprising:

a reduction ratio arithmetic operation circuit means coupled with said engine revolution speed sensor means and said vehicle speed sensor means for generating a reduction ratio electric signal indicative of a reduction ratio between said drive and driven pulleys;

a required line pressure generator means coupled with said reduction ratio arithmetic operation circuit for generating a required line pressure electric signal which is a predetermined function of said reduction ratio electric signal;

a line pressure regulator valve driver means coupled with said required line pressure generator means for generating a line pressure command electric signal in response to said required line pressure electric signal; and a line pressure regulator valve means coupled with said line pressure regulator valve driver means and communicating with the intake pipe for regulating the fluid supplied by said pumping means to provide said line pressure in response to said line pressure command electric signal and the intake manifold vacuum within the intake pipe;

wherein said line pressure regulator valve means comprises:

a valve body having a valve bore;

a spool disposed within said valve bore, said spool having a large diameter portion and a small diameter portion;

means defining a passage communicating with said pumping means to receive fluid therefrom;

said small diameter portion defining within said valve bore a first chamber communicating with said passage, said small diameter portion and said large diameter portion defining therebetween a second chamber which is drained;

said valve body having a port communicating with said second chamber and said passage;

said small diameter portion being exposed to fluid pressure within said first chamber to bias said spool in a first direction away from said first chamber;

means responsive to said line pressure command electric signal for pushing said spool in a second direction opposite to said first direction with a force variable in direct proportional to the reduction ratio and in inverse proportional to the intake manifold vacuum; and said large diameter portion covering said port to decrease an opening area to said second chamber when said spool moves in said second direction and uncovering said port to increase the opening area to said second chamber when said spool moves in said first direction.

21. A control apparatus as claimed in claim 20, wherein said pushing means comprises:

a solenoid device having a push rod contacting with said spool, a solenoid spring biasing said solenoid push rod against said spool and a solenoid for pulling said solenoid push rod against said solenoid spring with a force variable in direct propotional to electric current passing through said solenoid; and a spring biasing said spool in said second direction.

22. A control apparatus for a motor vehicle having an accelerator pedal, an engine having an intake pipe and a continuously variable transmission, the continuously variable transmission having a drive shaft drivingly connected to the engine, a driven shaft, a drive pulley including a cylinder chamber, a fixed conical disc secured to the drive shaft and a movable disc controllably movable in an axial direction of the drive shaft in response to fluid pressure in the cylinder chamber thereof, a driven pulley including a cylinder chamber, a fixed conical disc secured to the driven shaft, a movable disc controllably movable in an axial direction of the driven shaft in response to fluid pressure in the cylinder chamber thereof, and a V-belt running over the drive and driven pulleys to establish a driving connection therebetween, said control apparatus comprising:

an accelerator pedal sensor means coupled with the accelerator pedal for generating an accelerator pedal stroke electric signal indicative of a depression degree of the accelerator pedal;

an engine revolution speed sensor means coupled with the engine for generating an actual engine revolution speed electric signal indicative of an actual revolution speed of the engine;

means for generating an output electric signal indicative of a target engine revolution speed, said output electric signal generating means coupled with said accelerator pedal sensor means for generating a first target engine revolution speed electric signal which is a first predetermined function of said accelerator pedal stroke electric signal;

a fuel supply device control means coupled with said accelerator pedal sensor means for generating a target engine torque electric signal indicative of a target engine torque which is a second predetermined function of said accelerator pedal stroke electric signal;

a comparator means coupled with said engine revolution speed sensor means and said output electric signal generating means for generating a deviation signal indicative of a difference between said actual engine revolution speed electric signal and said output electric signal;

a shift control means coupled with said comparator means for varying a reduction ratio in the continuously variable transmission to vary the revolution speed of the engine in a direction to reduce said deviation signal;

a fuel supply device communicating with the intake pipe and including a control element means for adjusting supply of fuel to the engine;

means coupled with said fuel supply device control means for actuating said control element means in response to said target engine torque electric signal;

a vehicle speed sensor means coupled with the continuously variable transmission for generating a vehicle speed electric signal indicative of a vehicle speed;

a selected shift position sensor means for generating a shift position signal indicative of a selected shift position by a shift lever;

wherein said output electric signal generating means includes a limit engine revolution speed generator means coupled with said vehicle speed sensor means for generating a second target engine revolution speed electric signal which is a third predetermined function of said vehicle speed electric signal, and a switching means coupled with said engine revolution speed generator means, said limit engine revolution speed generator means and said selected shift position sensor means for allowing said first target engine electric signal to appear as said output electric signal when said shift position signal indicates that said shift lever is set to an ordinary drive range position and for allowing said second target engine revolution speed electric signal to appear as said output electric signal when said shift position signal indicates that said shift lever is set to one of a fixed reduction ratio position and a reverse drive position;

wherein said shift control means comprises:

a shift control valve driver means coupled with said comparator means for generating a first command electric signal in response to said deviation signal;

pumping means for the hydraulic fluid;

means for regulating the fluid supplied by said pumping means to provide a line pressure which varies in direct proportional to the reduction ratio between the drive and driven pulleys and in inverse proportional to an intake manifold vacuum;

a shift control valve means connected to said line pressure regulator valve means to receive said line pressure and coupled with said shift control valve driver means for controlling fluid supply to both of the cylinder chambers and fluid discharge therefrom in response to said first command electric signal;

wherein said means for regulating the fluid comprises:

a valve body having a valve bore;

a spool disposed within said valve bore, said spool having a large diameter portion and a small diameter portion;

means defining a passage communicating with said pumping means to receive fluid therefrom;

said small diameter portion defining within said valve bore a first chamber communicating with said passage, said small diameter portion and said large diameter portion defining therebetween a second chamber which is drained;

said valve body having a port communicating with said second chamber and said passage;

said small diameter portion being exposed to fluid pressure within said first chamber to bias said spool in a first direction away from said first chamber;

means responsive to reduction ratio between the drive and driven pulleys and intake manifold vacuum for pushing said spool in a second direction opposite to said first direction with a force variable in direct proportional to the reduction ratio and in inverse proportional to the intake manifold vacuum; and said large diameter portion covering said port to decrease an opening area to said second chamber when said spool moves in said second direction and uncovering said port to increase the opening area to said second chamber when said spool moves in said first direction.

23. A control apparatus as claimed in claim 22, wherein said pushing means comprises:

a lever swingable on a movable fulcrum point, said lever having one end operatively connected with said spool to bias said spool in said second direction;

a spring means for biasing the other end of said lever;

a diaphragm device having a housing, a diaphragm within said housing to define a vacuum chamber communicating with the intake pipe to receive the intake manifold vacuum, a push rod attached to said diaphragm and contacting with said other end of said lever, and a diaphragm spring disposed within said vacuum chamber for biasing said push rod against said other end of said lever; and mechanical means for moving said movable fulcrum in a longitudinal direction of said lever in response to movement of the movable conical disc of one of the drive and driven pulleys.

24. A control apparatus as claimed in claim 23, wherein said mechanical means for moving said movable fulcrum comprises a rod having one end portion engaging in said movable conical disc and other end carrying a roller on which said lever is swingable, said rod moving in a longitudinal direction thereof in response to movement of said movable conical disc.

25. A control apparatus as claimed in claim 17, including a safety throttle valve mounted within the intake pipe so as to control the passage area of the intake pipe, and a mechanical means for connecting said safety throttle valve to the accelerator pedal so as to control the opening degree of the safety throttle valve in response to the depression degree of the accelerator pedal such that said safety throttle valve is fully opened before the depression degree of the accelerator pedal becomes maximum.

26. A control apparatus for a motor vehicle having an accelerator pedal, an engine having an intake pipe, comprising:

an accelerator pedal sensor means coupled with the accelerator pedal for generating an accelerator pedal stroke electric signal indicative of a depression degree of the accelerator pedal;

a fuel supply device communicating with the intake pipe to supply fuel into the intake pipe;

means for controlling said fuel supply device in response to said accelerator pedal stroke electric signal;

a throttle valve disposed within the intake pipe and operatively connected with the accelerator pedal;

a safety throttle valve disposed within the intake pipe upstream of said throttle valve; and a mechanical means for connecting said safety throttle valve to the accelerator pedal so as to control the opening degree of said safety throttle valve in response to depression degree of the accelerator pedal such that the safety throttle valve is fully opened before the depression degree of the accelerator pedal becomes maximum.

27. A control apparatus for a motor vehicle having an accelerator pedal, an engine having an intake pipe, comprising:

an accelerator pedal sensor means coupled with the accelerator pedal for generating an accelerator pedal stroke electric signal indicative of a depression degree of the accelerator pedal;

a fuel supply device communicating with the intake pipe to supply fuel into the intake pipe;

means for controlling said fuel supply device in response to said accelerator pedal stroke electric signal;

a safety throttle valve disposed within the intake pipe;

a mechanical means for connecting said safety throttle valve to the accelerator pedal so as to control the opening degree of said safety throttle valve in response to depression degree of the accelerator pedal such that the safety throttle valve is fully opened before the depression degree of the accelerator pedal becomes maximum;

wherein said mechanical means comprises:

a return spring means for biasing said safety throttle valve into a fully closed position;

a stationary portion;

a wire having one end connecting to said safety throttle valve and passing through said stationary portion, said wire having an other end;

a stop fixed to said wire and disposed between said stationary portion and said safety throttle valve;

a spring having one end connected to said other end of said wire and an other end;

a mechanical linkage having one end connected to said other end of said spring and an other end connected to the accelerator pedal, said mechanical linkage being so constructed and arranged as to pull said spring in a direction tending to open said safety throttle valve as the depression degree of the accelerator pedal increases;

said stop coming into contact with said stationary portion when said safety throttle valve is fully opened before the depression degree of the accelerator pedal becomes maximum and stopping further movement of said wire when the accelerator pedal is depressed further;

said spring extending to allow further depression of the accelerator pedal after said stop has come into contact with said stationary portion.

* * * * *